United States Patent [19]
Ronning

[11] Patent Number: 5,883,955
[45] Date of Patent: Mar. 16, 1999

[54] ON-LINE TRY BEFORE YOU BUY SOFTWARE DISTRIBUTION SYSTEM

[75] Inventor: Joel A. Ronning, Edina, Minn.

[73] Assignee: Digital River, Inc., Edina, Minn.

[21] Appl. No.: 485,637

[22] Filed: Jun. 7, 1995

[51] Int. Cl.$^6$ ................................................ H04L 9/00
[52] U.S. Cl. .............................. 380/4; 380/49; 395/186; 705/26
[58] Field of Search ..................... 380/4, 25, 49; 364/949.81, 969, 969.4, 286.6; 340/825.31, 825.34; 395/186, 187.01, 188.01, 726, 856; 705/26, 27

[56] References Cited

U.S. PATENT DOCUMENTS

| | | | |
|---|---|---|---|
| 3,798,605 | 3/1974 | Feistel | 380/25 |
| 3,990,710 | 11/1976 | Hughes | 369/34 |
| 4,200,770 | 4/1980 | Hellman et al. | 380/30 |

(List continued on next page.)

FOREIGN PATENT DOCUMENTS

| | | |
|---|---|---|
| 57127249 | 11/1982 | Japan . |
| 60077218 | 9/1985 | Japan . |
| 03083132 | 6/1991 | Japan . |

OTHER PUBLICATIONS

Prosise, J., "DOS 5 Techniques and Utilities," *PC Magazine*, 6 pages (1991). p. 82–85.
Prosise, Jeff, "PC Magazine DOS 5 Techniques and Utilities", pp. 365–367, Ziff–Davis Press, PC Magaizine, Emeryville, California, 1991.

File History of U. S. Patent No. 4,658,093, issued Apr. 14, 1987.
File History of U. S. Patent No. 4,740,890, issued Apr. 26, 1988.
Amanda Mitchell, "Chicago Features Spark Online Distribution," *Computer Reseller News*, (Aug. 1994), p. 101.
"Testdrive Founder/CEO Resigns to Form New Info Highway Company," *Business Wire*, (Jun. 1994), Cupertino, CA.
Don Clark, "Multimedia: Patents May Raise Price of Information Highway," *The Wall Street Journal*, (Nov. 1993).
Walter S. Mossberg, "Personal Technology," *The Wall Street Journal*, (Dec. 1993).
"Try and Buy on CD–ROM," *Marketing Computers*, (Oct. 1993), p. 12.
"Multimedia World," *Advertising Age*, (Aug. 1993), p. 23.

*Primary Examiner*—Gail O. Hayes
*Assistant Examiner*—Pinchus M. Laufer
*Attorney, Agent, or Firm*—Merchant, Gould, Smith, Edell, Welter & Schmidt, P.A.

[57] ABSTRACT

A computer-based on-line system is provided for demonstrating software programs to a potential purchaser. The system receives from an on-line system a software program to be demonstrated, and maintains the software program in a locked state in order to prevent unauthorized duplication of the software program. The software program is enabled for execution upon selection by a user, and the user is allowed to subsequently operate or sample the software program. The system maintains the software program in the locked state during the sampling in order to prevent unauthorized duplication of the software program. The sampling of the software program is selectively disabled, such as when the user completes the sampling or if the system detects that the user is attempting to copy the sampled application.

17 Claims, 22 Drawing Sheets

U.S. PATENT DOCUMENTS

| | | | |
|---|---|---|---|
| 4,218,582 | 8/1980 | Hellman et al. ........................... 380/30 |
| 4,264,782 | 4/1981 | Konheim ................................... 380/25 |
| 4,405,829 | 9/1983 | Rivest et al. ............................... 380/30 |
| 4,424,414 | 1/1984 | Hellman et al. ........................... 380/30 |
| 4,446,519 | 5/1984 | Thomas .................................... 395/491 |
| 4,458,315 | 7/1984 | Uchenick ..................................... 380/4 |
| 4,465,901 | 8/1984 | Best ............................................ 380/4 |
| 4,490,810 | 12/1984 | Hon ........................................... 463/43 |
| 4,528,643 | 7/1985 | Freeny, Jr. .......................... 364/468.23 |
| 4,558,413 | 12/1985 | Schmidt et al. ........................ 395/600 |
| 4,567,512 | 1/1986 | Abraham ................................ 380/5 X |
| 4,590,557 | 5/1986 | Lillie ...................................... 395/700 |
| 4,649,510 | 3/1987 | Schmidt ....................................... 380/4 |
| 4,654,799 | 3/1987 | Ogaki et al. ........................... 364/479 |
| 4,658,093 | 4/1987 | Hellman ................................... 380/25 |
| 4,672,554 | 6/1987 | Ogaki ...................................... 364/479 |
| 4,674,055 | 6/1987 | Ogaki et al. ........................... 364/479 |
| 4,685,055 | 8/1987 | Thomas ....................................... 380/4 |
| 4,740,890 | 4/1988 | Tobin ...................................... 395/186 |
| 4,780,905 | 10/1988 | Cruts et al. ............................... 380/44 |
| 4,787,050 | 11/1988 | Suzuki ............................... 395/200.09 |
| 4,796,220 | 1/1989 | Wolfe .......................................... 380/4 |
| 4,827,508 | 5/1989 | Shear ........................................... 380/4 |
| 4,864,516 | 9/1989 | Gaither et al. ......................... 395/153 |
| 4,888,798 | 12/1989 | Earnest ........................................ 380/4 |
| 4,949,257 | 8/1990 | Orbach ................................ 364/401 R |
| 4,999,806 | 3/1991 | Chernow et al. ...................... 380/4 X |
| 5,006,849 | 4/1991 | Baarman et al. ......................... 341/95 |
| 5,010,571 | 4/1991 | Katznelson ................................. 380/4 |
| 5,014,234 | 5/1991 | Edwards, Jr. .......................... 380/4 X |
| 5,016,009 | 5/1991 | Whiting et al. ........................... 341/67 |
| 5,047,928 | 9/1991 | Wiedemer ............................... 364/406 |
| 5,103,392 | 4/1992 | Mori ............................................. 380/4 |
| 5,103,476 | 4/1992 | Waite et al. ................................. 380/4 |
| 5,109,413 | 4/1992 | Comerford et al. ........................ 380/4 |
| 5,166,886 | 11/1992 | Molnar et al. .......................... 380/4 X |
| 5,199,066 | 3/1993 | Logan ......................................... 380/4 |
| 5,222,134 | 6/1993 | Waite et al. ................................. 380/4 |
| 5,237,157 | 8/1993 | Kaplan . |
| 5,241,671 | 8/1993 | Reed et al. .............................. 395/600 |
| 5,267,171 | 11/1993 | Suzuki et al. .......................... 364/479 |
| 5,269,698 | 12/1993 | Singer ..................................... 439/157 |
| 5,293,422 | 3/1994 | Loiacono .................................... 380/4 |
| 5,327,563 | 7/1994 | Singh ...................................... 395/700 |
| 5,341,429 | 8/1994 | Stringer et al. ........................... 380/23 |
| 5,355,302 | 10/1994 | Martin et al. . |
| 5,388,211 | 2/1995 | Hornbuckle ............................ 395/700 |
| 5,487,143 | 1/1996 | Southgate ............................... 395/157 |
| 5,495,411 | 2/1996 | Ananda ............................... 364/401 R |
| 5,509,070 | 4/1996 | Schull ......................................... 380/4 |
| 5,515,538 | 5/1996 | Kleiman . |
| 5,526,485 | 6/1996 | Brodsky ............................. 395/183.14 |
| 5,530,865 | 6/1996 | Owens et al. .......................... 395/700 |
| 5,563,946 | 10/1996 | Cooper et al. .............................. 380/4 |
| 5,564,038 | 10/1996 | Grantz et al. ......................... 380/25 X |
| 5,579,479 | 11/1996 | Plum ........................................... 380/4 |
| 5,625,690 | 4/1997 | Michel et al. .............................. 380/4 |
| 5,654,905 | 8/1997 | Mulholland et al. ................... 702/186 |
| 5,666,411 | 9/1997 | McCarty ..................................... 380/4 |
| 5,671,281 | 9/1997 | Campbell et al. ......................... 380/25 |
| 5,675,645 | 10/1997 | Schwartz et al. ................. 395/188.01 |
| 5,689,560 | 11/1997 | Cooper et al. .............................. 380/4 |
| 5,715,403 | 2/1998 | Stefik ......................................... 705/44 |

ON-LINE TRY BEFORE YOU BUY SOFTWARE DISTRIBUTION SYSTEM

FIELD OF THE INVENTION

The present invention relates to a system and method for on-line distribution of software programs and for allowing a potential purchaser or other person to sample the software programs.

BACKGROUND OF THE INVENTION

Customers or potential purchasers of software programs often desire to test the programs before determining whether or not to purchase them. This may occur because written literature does not adequately provide the customer with a feel for the functionality of the software program when in operation. The written literature simply describes the program, and customers often want to actually work with the software program in order to determine if they want to buy the program.

Some software vendors provide demonstration programs of their software programs for sale. These demonstration programs are not the fully operating version of the software program. The demonstration program simply contains some of the functionality of the full software program in order to provide the customer with a feel for the functionality of the program. Since the demonstration version is not a fully operating version of the program, however, it does not provide a customer with a complete picture of the program's functionality. Therefore, demonstration versions are limited in how they may assist a customer in deciding whether to purchase a particular software program.

Recently, some software vendors are providing fully operating versions of software programs which a customer may sample. These software programs are intended to be securely stored on a particular storage medium. Therefore, when a customer samples a fully operating version of a program, the program being sampled is securely maintained by another program which seeks to prevent the customer from obtaining a free copy of the sampled program.

These software vendors typically distribute the programs to be sampled on some type of transportable storage medium. For example, a software vendor may provide a floppy diskette on which is contained the program to be sampled. The diskette may be locked due to changes to the physical storage medium such that the customer may not obtain a free copy of the program. Other software vendors provide a CD-ROM which stores a large number of programs which may be sampled. The CD-ROM also contains a program which manages and in effect supervises the sampling of the programs such that a customer may not obtain copies of the programs without first purchasing them and obtaining particular unlocking codes.

These distribution systems for sampling fully operating versions of programs, however, are generally limited in that they do not provide for on-line distribution. These systems typically distribute the programs on some type of transportable storage medium, such as a CD-ROM or hard disk drive sold with a computer. This type of distribution can be more burdensome to the computer user, because an on-line distribution channel is more easily accessible, since the computer users need simply "dial up" a network or bulletin board.

These systems for providing the sampling of fully operating versions of programs are also limited in the security provided to the programs being sampled. For example, they typically prevent unauthorized copying of programs by dividing the program or removing portions of the program such that a secure "key" is required to reassemble the program and thus operate it. These methods, however, require that one tamper with the program, which can make the program unstable. In addition, these methods typically do not work with all applications. For example, some applications use a checksum program to prevent damage from computer viruses. These distribution methods change the format of the program, which can result in the checksum virus check incorrectly returning a error or message that the program is corrupted.

SUMMARY OF THE INVENTION

This invention is an on-line system and method for demonstrating software programs to a potential purchaser of the programs. The system receives from an online system a software program to be demonstrated, and maintains the software program in a locked state in order to prevent unauthorized duplication of the software program.

The software program is enabled for execution upon selection by a user, and the user is allowed to subsequently operate or sample the software program. The system maintains the software program in the locked state during the sampling in order to prevent unauthorized duplication of the software program. The sampling of the software program is selectively disabled, such as when the user completes the sampling or if the system detects that the user is attempting to copy the sampled application.

DETAILED DESCRIPTION

Figure 1:
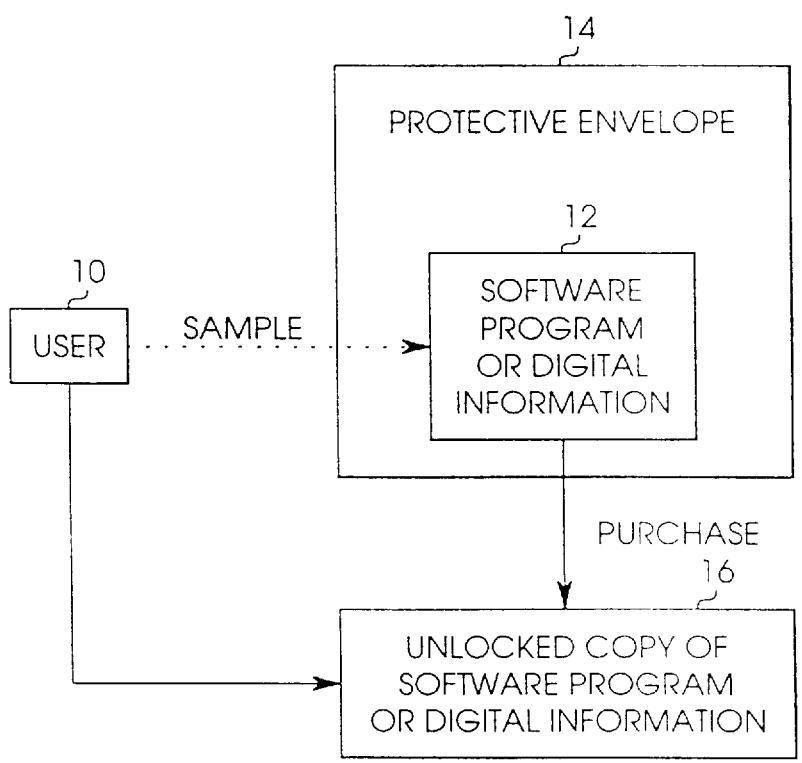
FIG. 1 is a diagram of the conceptual operation of a software or digital information distribution system.

FIG. 1 is a conceptual diagram of the operation of a software or digital information distribution system. A user or customer 10 may sample a software program 12, which typically involves working with a fully operating version of the software program 12. The system preferably maintains a secure interface or protective envelope 14 around the software program 12 such that the user 10 may not obtain a copy of the software program without first purchasing it. The system preferably maintains the sampled program in a locked state during the sampling of the program in order to prevent unauthorized duplication of the program, for example, during the sampling. The system selectively disables the sampling of the selected software program, such as when the user completes the sampling or tampers with the program during the sampling. The use of a secure interface or protective envelope 14 provides the advantage of not tampering with the program for security purposes. This type of scheme for maintaining a program in a locked state is described below. Other methods for maintaining software programs in a locked state to prevent unauthorized copying of the program are possible, such as is disclosed in U.S. Pat. Nos. 4,658,093; 4,740,890; 4,999,806; and 5,341,429.

If the user 10 purchases the software program 12, then the system copies an unlocked copy of the software program 16 to a storage medium where the user may access and continue to use the program. "Software program," "program," and "application," are used interchangeably herein.

The present invention can also distribute digital information (12), as indicated in FIG. 1. The present invention views the distributed entity as "bits," whether it is a software program which includes functionality for controlling the operation of a computer, or simply other types of information in digital form. Therefore, the principles of the present invention used for distribution of information apply to digital information generally, software programs being a type of digital information. Digital information includes information capable of being represented in digital form. Digital information thus includes software programs and also includes intellectual property such as data representing creative or artist expression. Other examples of digital information include: textual works such as books and articles; music; video; music video; fonts; graphics; and clip art.

In distributing digital information, a user may have the option to sample the information. For example, when distributing locked movies in digital form, a user may be allowed to view the first few minutes of the movie. For distributing music, a user may be allowed to sample a representative portion of the music. If the digital information is a software program, the user may be allowed to sample the program, as mentioned above.

The digital information may also be distributed without sample capability. For example, a publisher may distribute a CD-ROM having several locked "white papers" or technical works. The system can, for example, only display titles or abstracts to a user for purposes of allowing the user to decide which if any textual works to purchase. When a user requests to purchase one or more of the papers, the system unlocks the paper and distributes it to the user. This distribution scheme thus provides the advantage of allowing one to purchase individual textual works in a collection without having purchase the entire compilation.

The system, therefore, maintains the digital information in a locked state by using the secure interface or protective envelope 14. When a user requests to purchase the information and provides any required information such as a credit card number, the system distributes an unlocked copy (16) of the digital information to the user.

Figure 2:
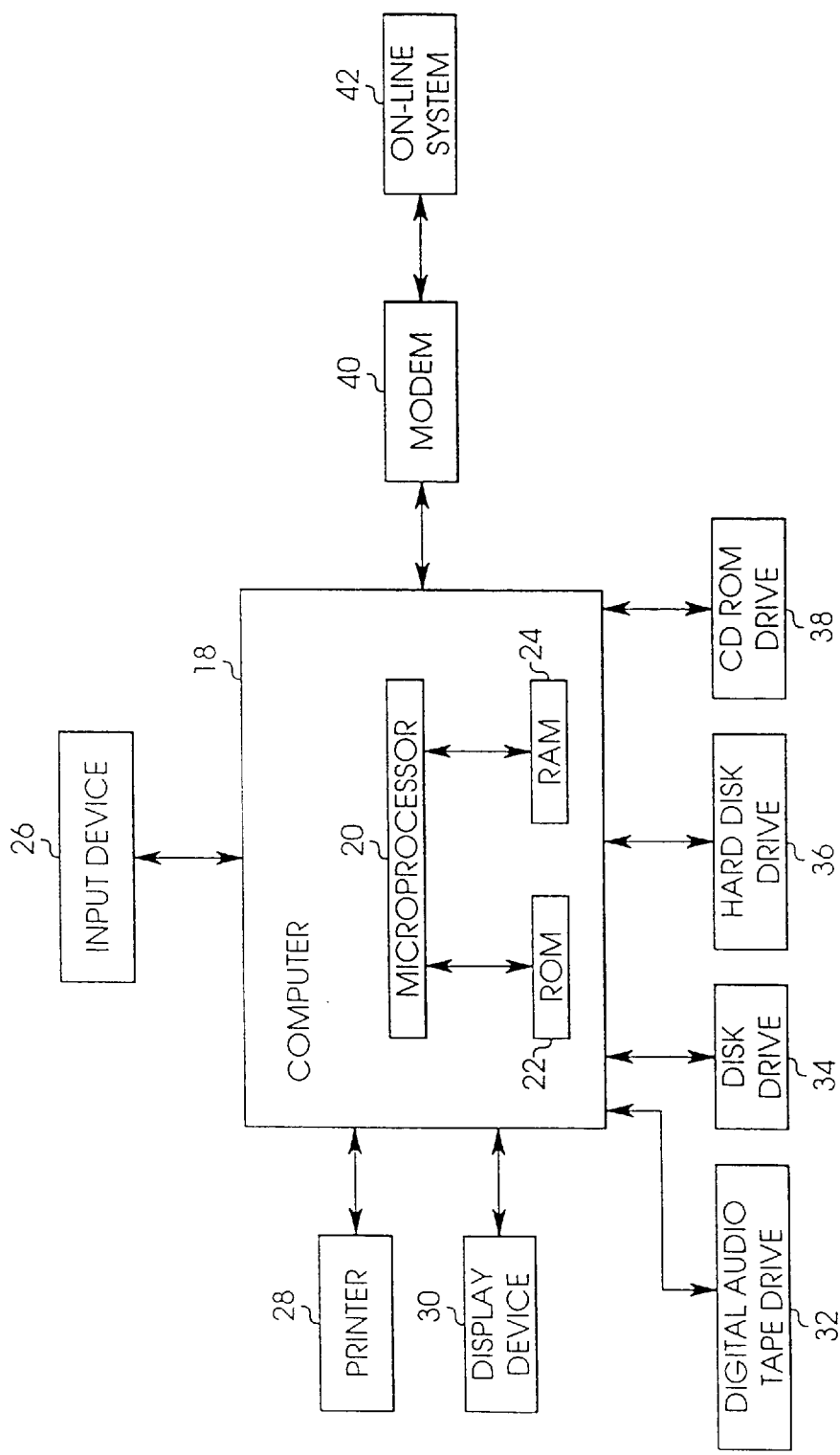
FIG. 2 is a block diagram of hardware components for implementing a software or digital information distribution system.

FIG. 2 is a diagram of typical hardware components for implementing a software or digital information distribution system. The system includes a computer 18 which is a typical digital computer such as a personal computer. The computer 18 includes a microprocessor 20 for executing software programs. The microprocessor 20 is interfaced with a read only memory 22 and random access memory 24. The computer 18 is interfaced with an input device 26 for entering commands or information into the computer 18. The input device 26 may be implemented with, for example, a keyboard, touch screen, light pen, "mouse" or other cursor control device such as a trackball, or other device for entering information or commands into the computer 18. The computer 18 is typically interfaced with a printer 28, which may be implemented with a typical computer printer for generating a hard copy of the information stored within the computer 18. The computer 18 is also typically interfaced with a display device 30, which may be implemented with a typical color or monochrome computer monitor. A preferred hardware platform for implementing the present invention is a Macintosh computer, developed and sold by Apple Computer, Inc.

The computer 18 is also preferably interfaced to devices from which it may receive software programs to be sampled optionally along with a software program for managing the sampling of additional software programs. These external devices may include a digital audiotape drive 32, disk drive 34, hard disk drive 36, CD-ROM drive 38, or an on-line system 42 interfaced through a modem 40. The on-line system 42 may be interfaced to existing networks or on-line services such as, for example, the Internet, America OnLine®, and Prodigy®. Computer users may download information from networks such as the Internet.

Figure 3:
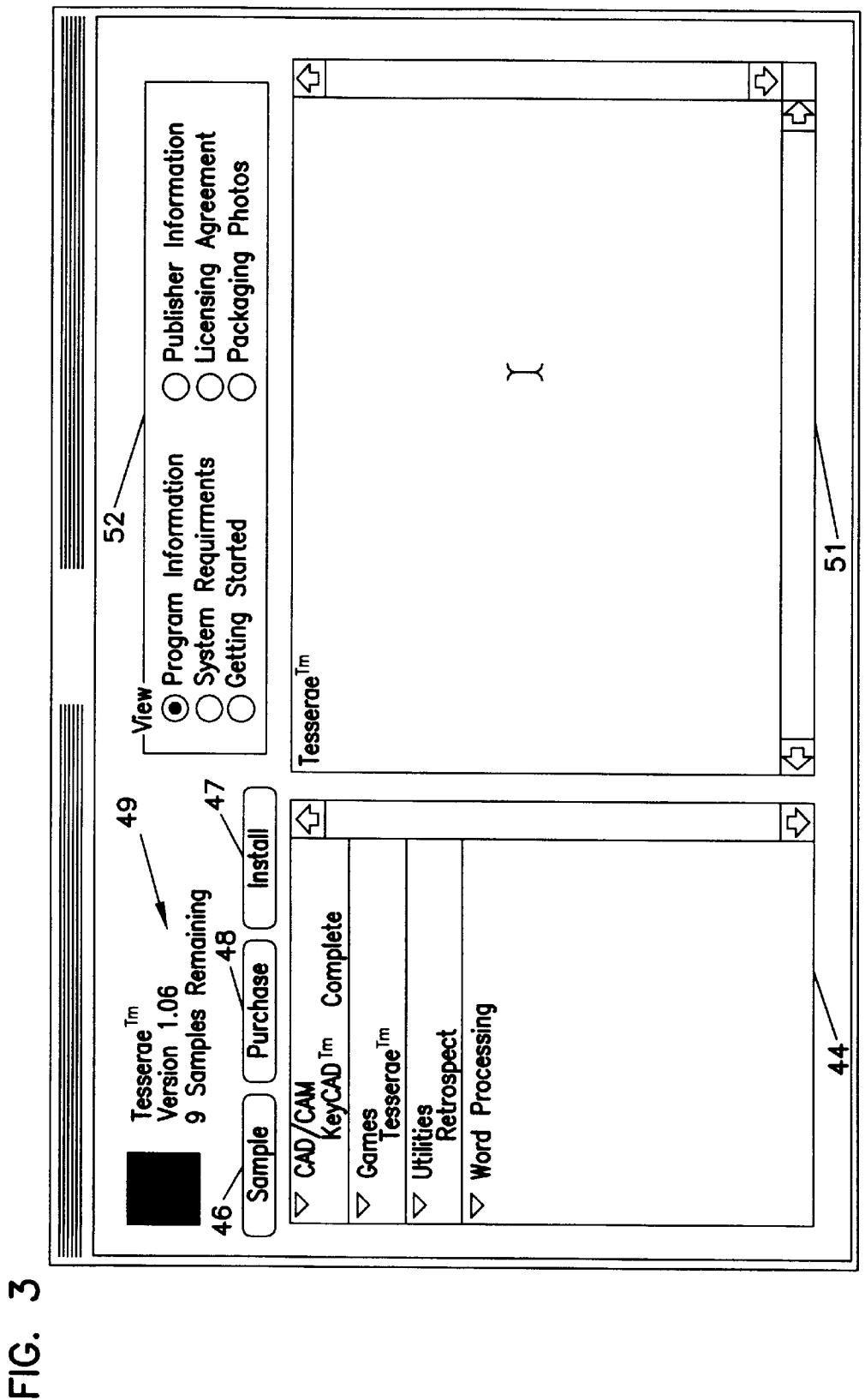
FIG. 3 is a user interface for a software or digital information distribution system illustrating examples of programs available to be sampled and/or purchased.

FIG. 3 is a user interface of a software or digital information distribution system operating within the computer 18 by the microprocessor 20. User interface 50 displays in window 44 a plurality of programs which a user may sample and/or purchase. Alternatively, window 44 can display an identification of digital information available for purchase. In order to sample a particular program, a user would select one of the plurality of programs in window 44 and then select icon 46. In addition, the system allows a user to select other information identified in window 52, and that information is displayed in window 51, such as: program information; system requirements; information about "getting started" with a particular application; publisher information; licensing agreement; and packaging photos.

If the user desires to purchase one of the programs, a user would select the purchase icon 48 and optionally the install icon 47 in order to have the program automatically installed. When a user samples a particular program, the system preferably displays the number of samples remaining at location 49 and optionally additional information such as the version of the sampled program. As explained below, the system can thus control how many samples are available to the user. FIG. 3 is one example of user interfaces for a software or digital information distribution system. Other user interfaces or ways of allowing a user to interact with the system are possible for such a system.

Figure 4A:
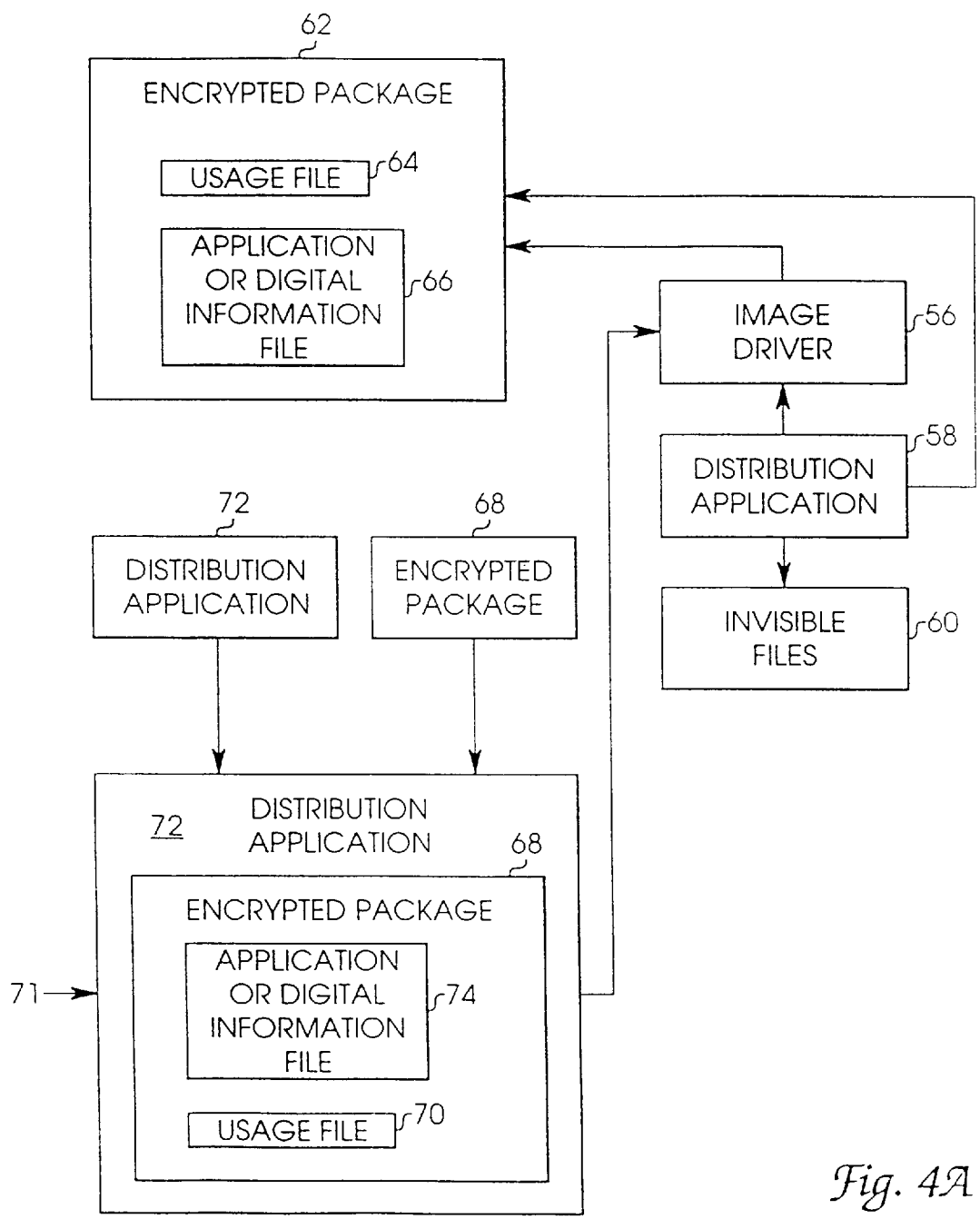
FIG. 4A is a diagram of software program files used by a software or digital information distribution system.

FIG. 4A is a diagram of files used by a software or digital information distribution system. An example of a software or digital information distribution system is also referred to as a "distribution application" in the present specification. The system typically uses an image driver 56 and invisible files 60. FIG. 4A also illustrates how a software or digital information distribution system may be implemented in a separate "stand-alone" version and a self-launching version. In one embodiment, the system 58 is a separate software program which interfaces an encrypted package 62 containing a usage file 64 and a program or digital information 66 to be distributed and/or sampled. The usage file 64 typically contains a separate redundant copy of how the program or digital information is to be used; for example, how many samples are available. This is in addition to the invisible files, which store encrypted copies of how many samples are available, as explained below. Accordingly, the usage file 64 provides another level of protection in the event that a user tampers with or otherwise alters the sample count information in the invisible files. The software program or digital information is preferably encrypted, as explained below, in order to prevent a user from obtaining a "free" copy of the information.

In another embodiment, a self-launching system implementing a software or digital information distribution system 72 is attached to a usage file 70 and program or digital information 74 to be distributed and/or sampled. In this embodiment, distribution application is attached to each program or information to be distributed and/or sampled and its operation is thus essentially invisible to the user. Therefore, instead of requiring a user to install a software or digital information distribution system and then sample other software programs, a user may simply download each program to be sampled and/or purchased. Each of those packages contains a distribution application for controlling the sampling or distribution of software programs or digital information along with such programs or information.

The distribution application 72 is typically attached to the encrypted package by joining the distribution application stored in a resource fork and the encrypted package stored in the data fork into one file 71. The operation of the resource fork for storing structured data and the data fork for storing random access data in a Macintosh computer system is well known. Therefore, the file 71 includes the distribution application 72 "wrapped around" the encrypted package 68 which includes an encrypted application or digital information 74 along with the encrypted usage file 70. The distribution application 72 also contains the invisible files. The package 68 is typically encrypted in the same manner as package 62.

As mentioned above, applications used by a software or digital information distribution system are maintained in a locked state. This locked state is used to prevent unauthorized copying of the program both while it is stored and when a user samples it. The applications to be sampled are typically in a form only usable by a software or digital information distribution system in order to ensure security. Encryption as part of a locked state is typically accomplished by exclusive-ORing ("XORing") each byte of the application with a positional variant, as is explained with reference to FIGS. 16A and 16B. In addition, a package file system is also typically used as a part of a locked state to ensure security of the applications in a locked state.

Figure 4B:
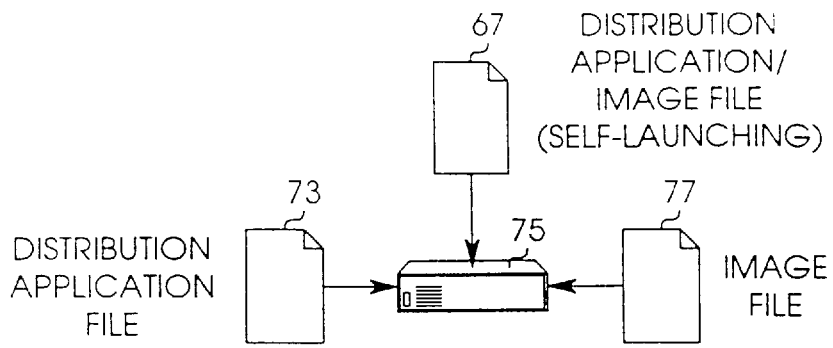
FIGS. 4B and 4C are diagrams of a package file system for use in maintaining software programs or digital information in a locked state.
Figure 4C:
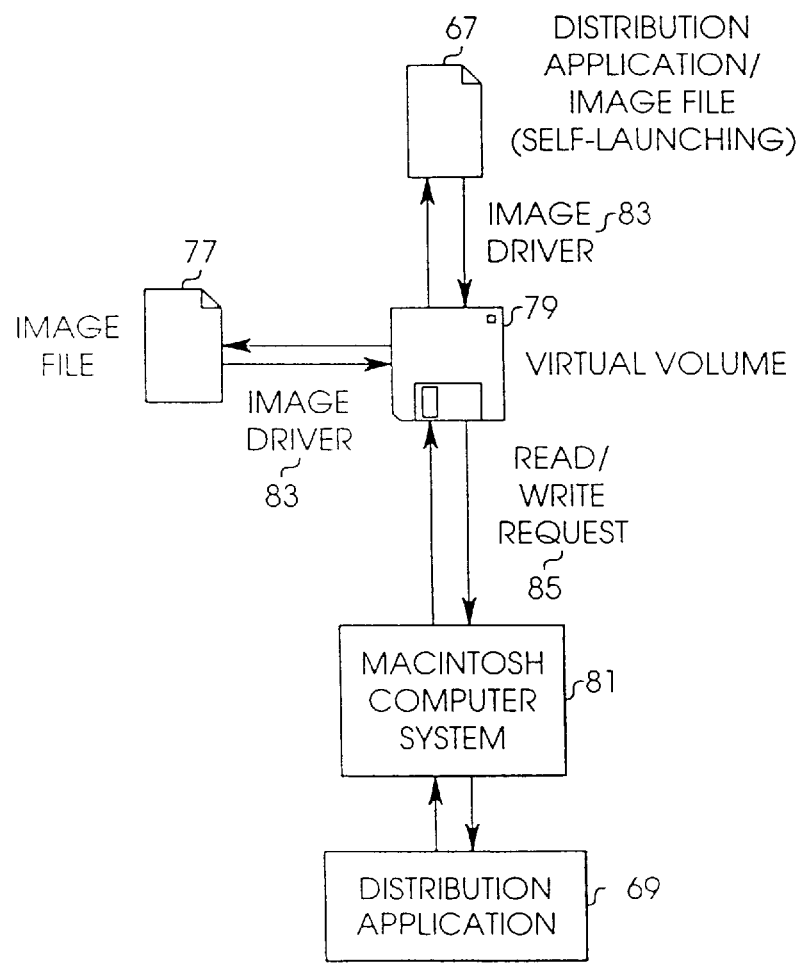

This package file system is illustrated in FIGS. 4B and 4C. As shown in FIG. 4B, a package file in a Macintosh computer system works much like a random access memory (RAM) disk except that it is in non-volatile memory. An image file 77 which is the desired size of a "virtual volume" created by a software or digital information distribution system is allocated on a hard drive 75 or other non-volatile storage medium. Locked applications or digital information are stored within this partition. In a self-launching distribution application, the distribution application and image file appear as one file 67. A distribution application file 73 is also stored on the storage medium 75.

As shown in FIG. 4C, the image file 77, or in the self-launching case the distribution application/image file 67, is internally given the same structure as a floppy disk. A distribution application 69 then informs the operating system of the corresponding computer that a "floppy disk" 79 is actually mounted. The operating system of a computer system 81 sends read/write requests 85 to the virtual volume 79. Instead of writing to a physical media, the driver of the computer's operating system writes to the virtual volume 79. The image driver 83 of the distribution application 69 performs reading and writing to the image files 77 and 67. This technique is also known as a "soft partition," because the hard drive on which the image file is located has been effectively partitioned via software. Accordingly, a distribution application 69 can reserve this virtual volume in order to control reading and writing to this partition (the physical media) and thus prevent unauthorized copying of applications or digital information in this partition.

Figure 5:
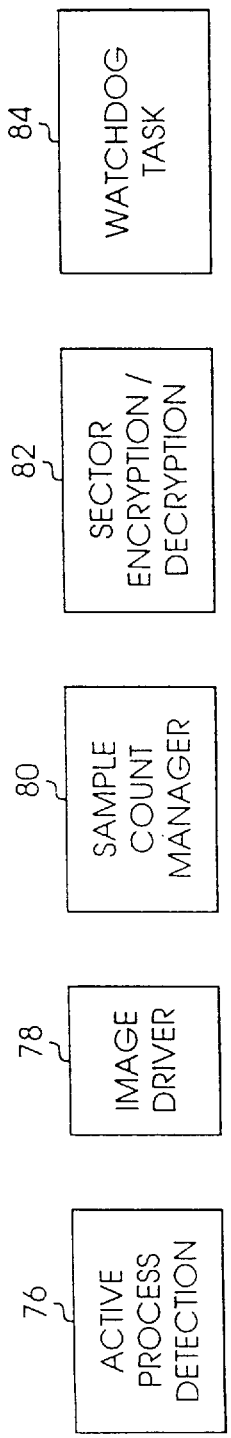
FIG. 5 is a diagram of background processes used by a software or digital information distribution system.

FIG. 5 is a diagram of background processes used by a software or digital information distribution system implemented within the computer 18 and executed by the microprocessor 20. The background processes preferably include an active process detection 76, image driver 78, sample count manager 80, sector encryption/decryption 82, and watchdog task 84, all of which are described below.

Figure 6:
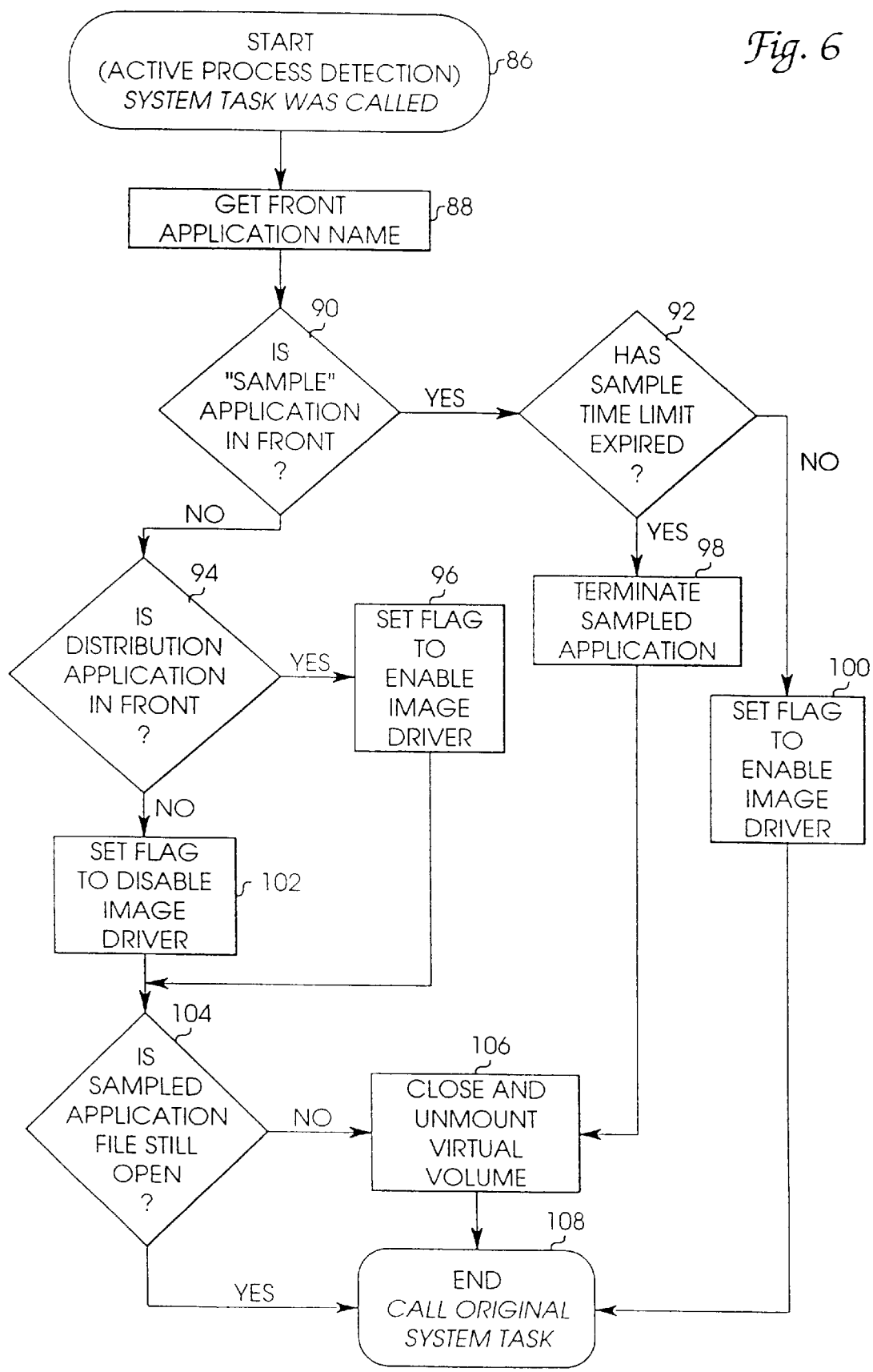
FIG. 6 is a flow chart of a preferred active process detection routine.

FIG. 6 is a flow chart of an active process detection routine. On an exemplary embodiment on a Macintosh computer, this routine is implemented by a patch to the system trap called SystemTask. This trap is called consistently by all applications many times a second. What makes this work is that the Finder intercepts calls to SystemTask, and only passes on the call of the application that is the "active" or current "front-most" process. Therefore, when a patch to SystemTask is called, the system assumes that the front application called it. The system then checks the low level variable AppName to retrieve the name of the current front-most application.

In a windows or multi-tasking environment, several applications can be represented by windows which may overlap. A currently-active application is typically represented in a window which appears in front of the other windows, or is otherwise highlighted or altered to indicate that it is the currently-active program if, for example, the displayed windows are not overlapping.

The routine begins when the system task is called (86). The system retrieves the front-most application name (88) and determines if the sample program is in front (90). The sample program is the software program being sampled by the user. The system determines if this is the top-most or front-most program displayed on a user's monitor. If it is the application in front, the system determines if sample time limit has expired (92); otherwise, the system determines if a distribution application is in front (94). A time limit provides for additional security by limiting how long a user may sample a particular application. If the time limit has not expired, the system sets a flag to enable the image driver (100) and calls the original system task (108). Otherwise, if the sample time limit has expired, the system terminates the sample application (98).

If as determined at step 94 the sample application is in front, the system sets a flag to enable the image driver (96); otherwise, a flag is set to disable the image driver (102). Next, the system determines if the sample application file is still open (104). If it is not, the system closes and unmounts the virtual volume (106) and calls the original SystemTask (108).

The routine of monitoring which application is "in front" thus provides a security measure by preventing the unauthorized copying of an application while it is being sampled. This system for preventing unauthorized duplication of a particular active software program among a plurality of active software programs executed on a computer typically includes the following features. It receives an indication that the computer is executing the particular software program, and monitors operation of the computer to determine which of the plurality of the active software programs is being currently executed. Execution of the particular software program is disabled when the monitoring determines that the particular software program is not the currently-active or top-most software program.

Figure 7:
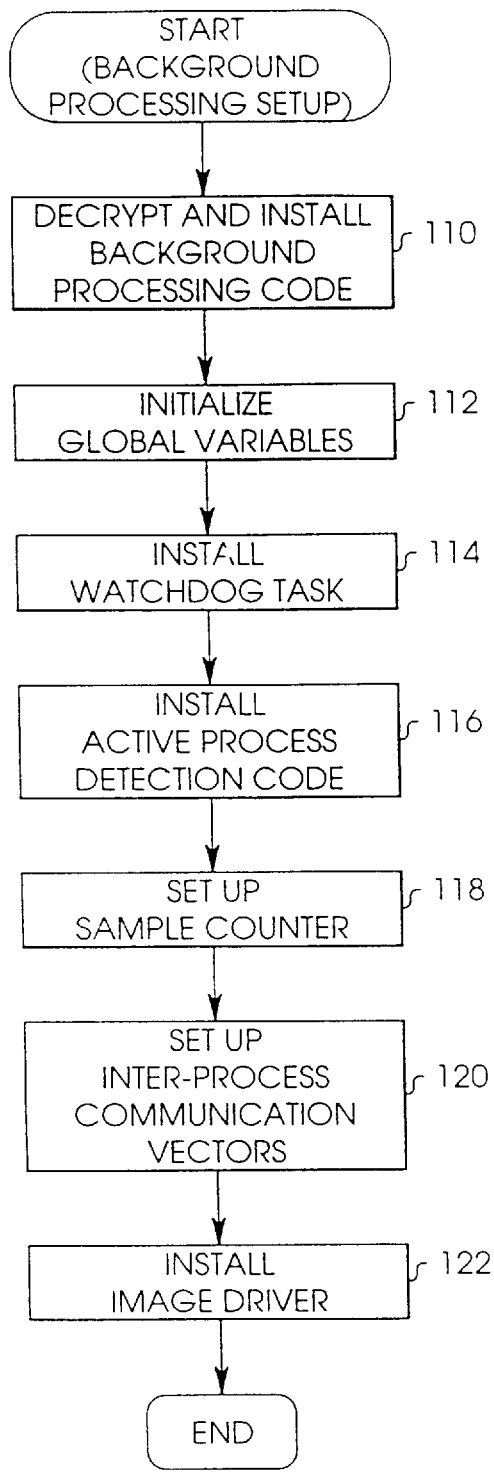
FIG. 7 is a flow chart of a preferred background processing setup routine.

FIG. 7 is a flow chart of a background processing setup routine. In this routine, the system decrypts and installs a background processing code (110); initializes the global variables (112); installs a watchdog task (114) (see FIG. 18); installs active process detection code (116) (see FIG. 12); sets up a sample counter (118) (see FIG. 17); sets up interprocess communication vectors (120); and installs an image driver (122) (see FIG. 13).

Figure 8:
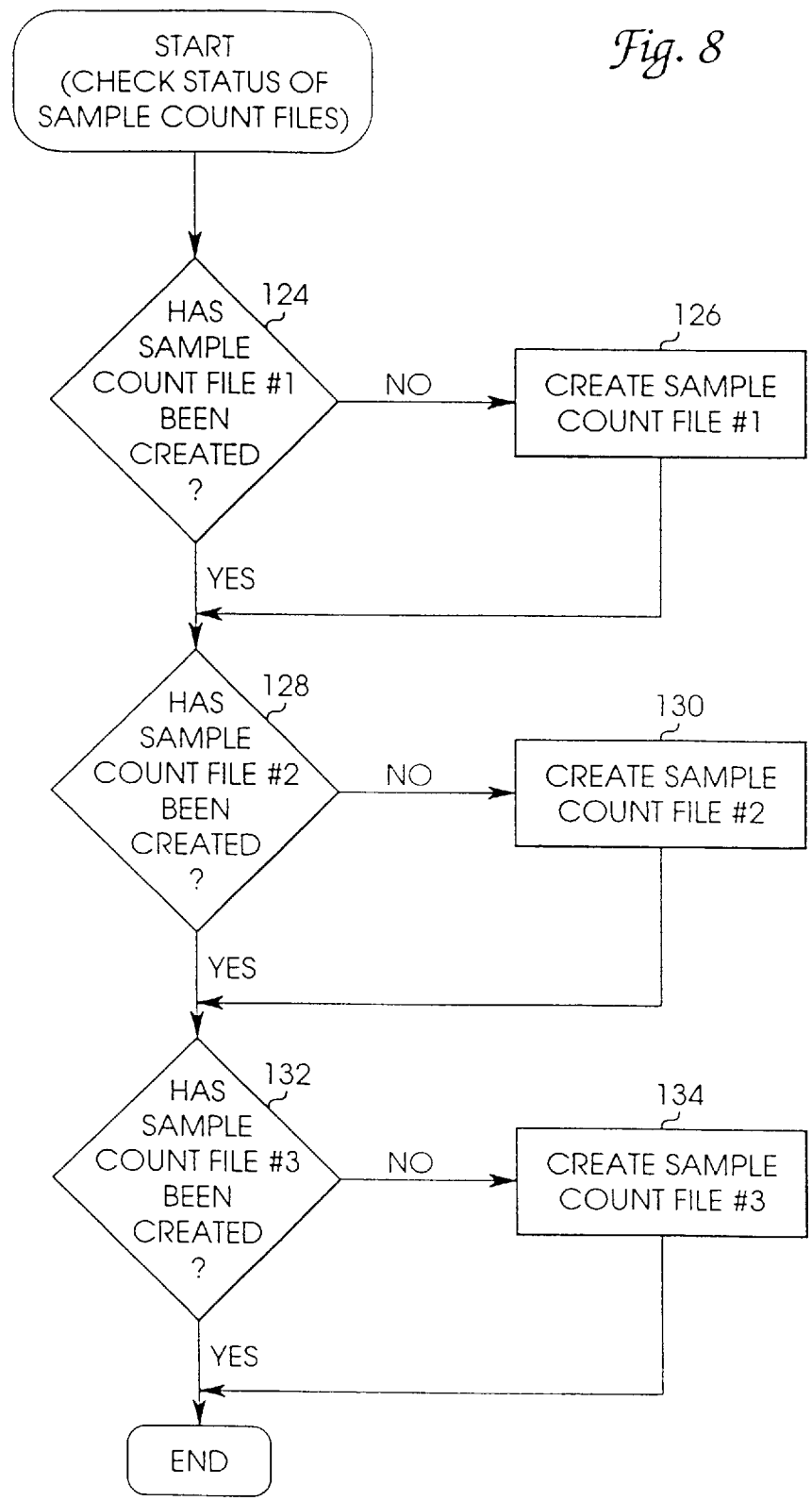
FIG. 8 is a flow chart of a preferred check status of sample count files routine.

FIG. 8 is a flow chart of a check status of sample count files routine. The system preferably uses sample count files stored within the computer 18 as invisible files. These sample count files are preferably each identical and maintain the sample count. Each file typically contains an identification of each application and the number of allowed samples for each of the applications. If the user attempts to tamper with a particular sample count file in order to obtain more samples, the system detects that tampering by comparing the tampered file with the other sample count files. In addition, the invisible files are preferably encrypted for additional security, such as using an XOR operation with a key and a bit shift of the sample counts.

In this routine, the system determines at steps 124, 128, and 132 if the sample count files one, two, and three, respectively, have been created. If the sample count files have not been created, the system creates the corresponding sample count files at steps 126, 130 and 134. While the system uses three sample count files, more or fewer files may be used.

Figure 9:
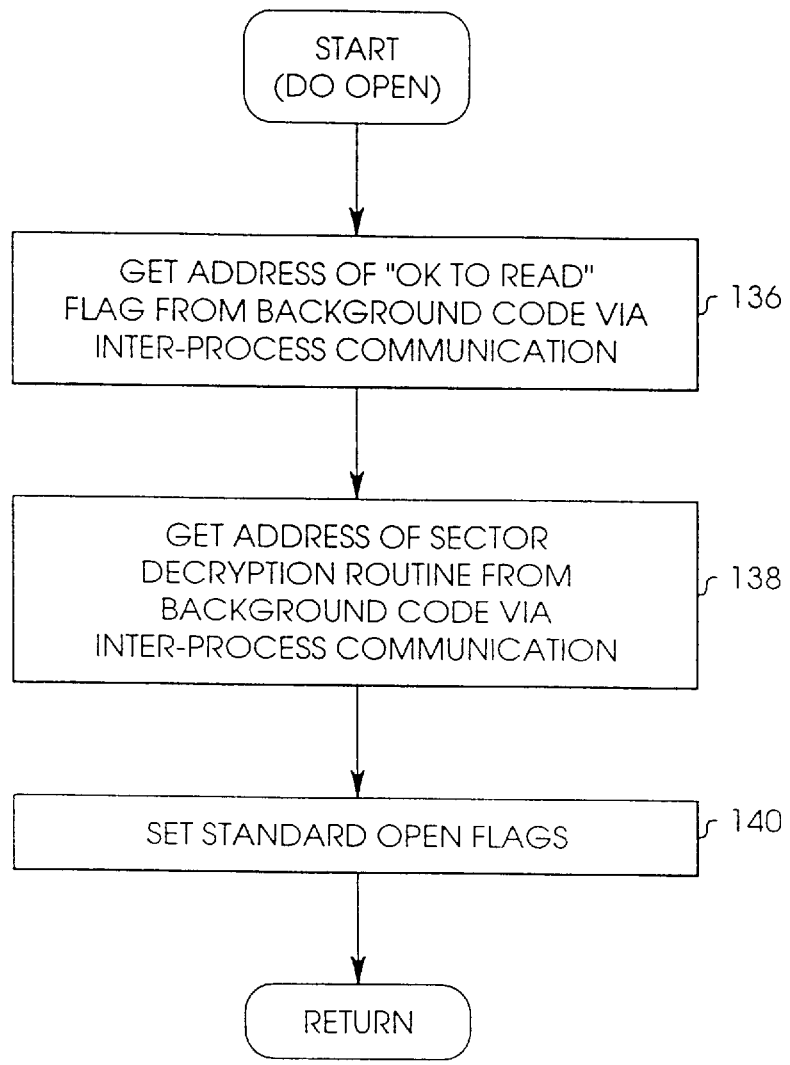
FIG. 9 is a flow chart of a preferred "do open" routine.

FIG. 9 is a flow chart of a "do open" routine. The system first retrieves the address of "OK to Read" flag from a background code via interprocess communication (136). Next, the system retrieves the address of a sector decryption routine from the background code via interprocess communication (138) and sets standard open flags (140).

Figure 10:
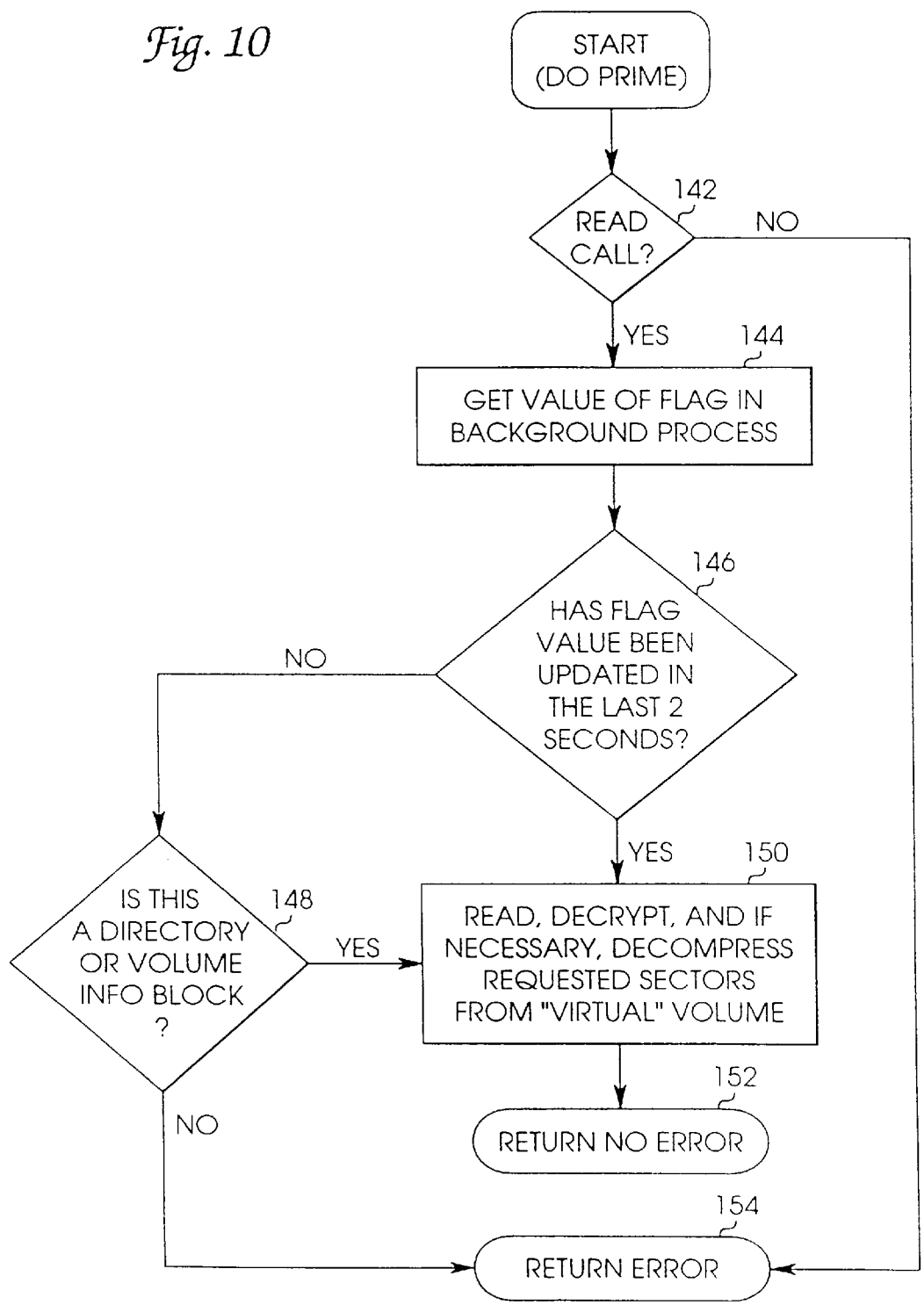
FIG. 10 is a flow chart of a preferred "do prime" routine.

FIG. 10 is a flow chart of a "do prime" routine. The system first determines if this is read call (142). This test makes the driver read only. If this is not a read call, the system returns an error (154). Otherwise, the system proceeds with the routine and retrieves a value of a flag in the background process (144). It is next determined if the flag value has been updated within the last two seconds (146), for example. A flag is stored in the background process that is constantly updated by the watchdog task. If the flag has not been updated in the last two seconds, for example, it means that either a valid application is not "in front" (the sample application or distribution application) as explained above, or that a user is using a debugger to examine the code which implements the system. If the flag value has been updated in the last two seconds, the system reads requested sectors from "virtual" volume (150) and returns no error (152).

The system decrypts the sectors while reading them. The encryption/decryption of sector is explained with reference to FIGS. 16A and 16B. If the sectors of the application are compressed, the system also decompresses the sectors while reading them. An example of an asymmetrical compression/decompression algorithm, which produces a relatively short decompression time in comparison to compression time, is Apple Computer, Inc.'s Cinepak compression scheme at a lossless level. If the flag value has not been updated, the system determines if this is a directory or volume information block (148). If it is, the system executes step 150 and returns no error (152). Otherwise, the system returns an error (154).

Figure 11:
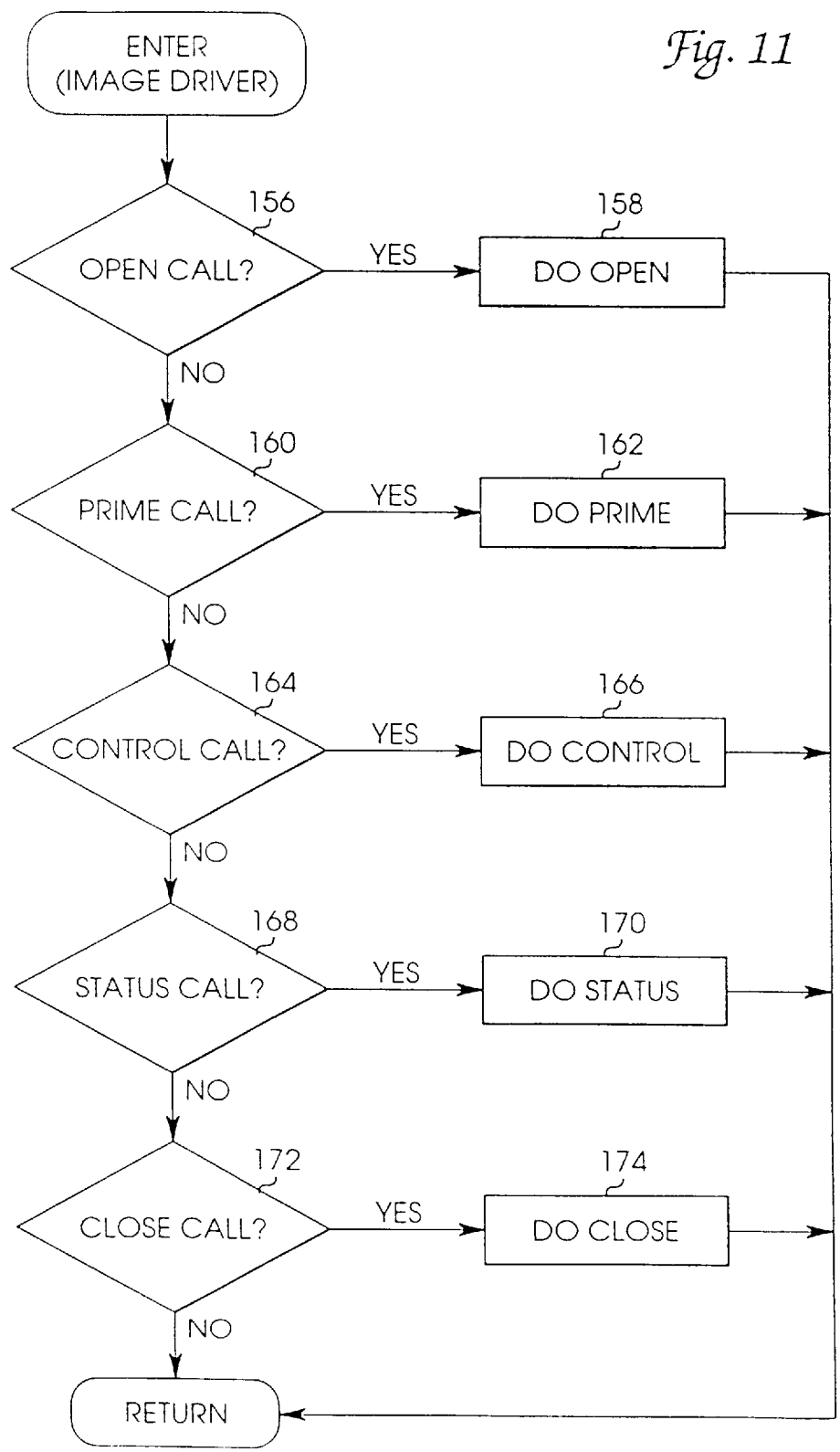
FIG. 11 is a flow chart of a preferred image driver routine.

FIG. 11 is a flow chart of an image driver routine. The image driver preferably includes the following functions: open call (156); prime call (160); control call (164); status call (168); and close call (172). If any of these functions have been called, then the system performs the corresponding routine: do open (158); do prime (162); do control (166); do status (170); do close (174). The do prime call (162) is illustrated in FIG. 10. The other calls (158, 166, 170, 174) are well known in a Macintosh computer system.

Figure 12:
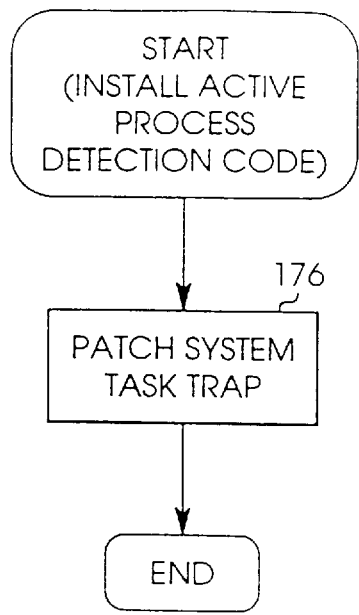
FIG. 12 is a flow chart of a preferred install active process detection code routine.

FIG. 12 is a flow chart of an install active process detection code routine. This routine involves performing a patch system task trap (176), which is illustrated in FIG. 6.

Figure 13:
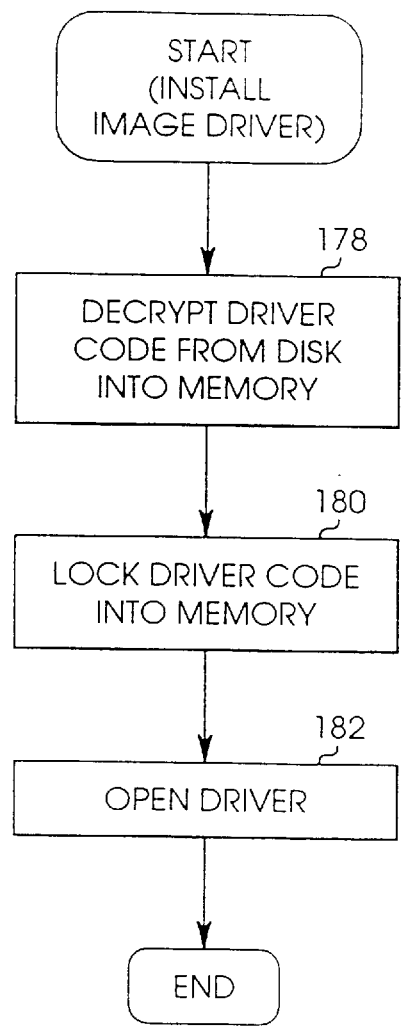
FIG. 13 is a flow chart of a preferred install image driver routine.

FIG. 13 is a flow chart of an install image driver routine. In this routine, the system decrypts a driver code from a disk into memory within the computer 18 (178). The image driver is encrypted for security purposes so that a user cannot view the driver. The encryption/decryption of the driver is typically accomplished using the technique explained with reference to FIGS. 16A and 16B. The system locks the driver code into memory (180). The system then opens the driver (182).

Figure 14:
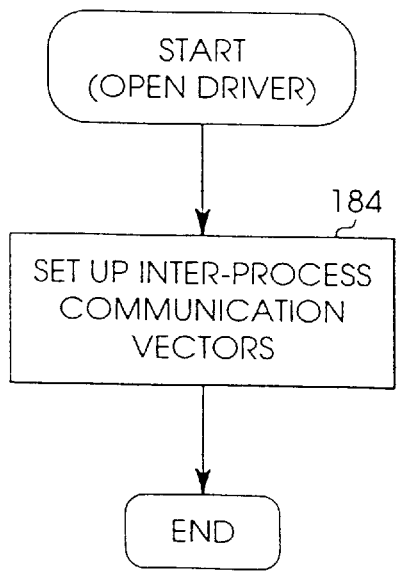
FIG. 14 is a flow chart of a preferred open driver routine.

FIG. 14 is a flow chart of an open driver routine. In this routine, the system sets up an interprocess communication vectors (184), which instructs the system where to locate global data.

Figure 15:
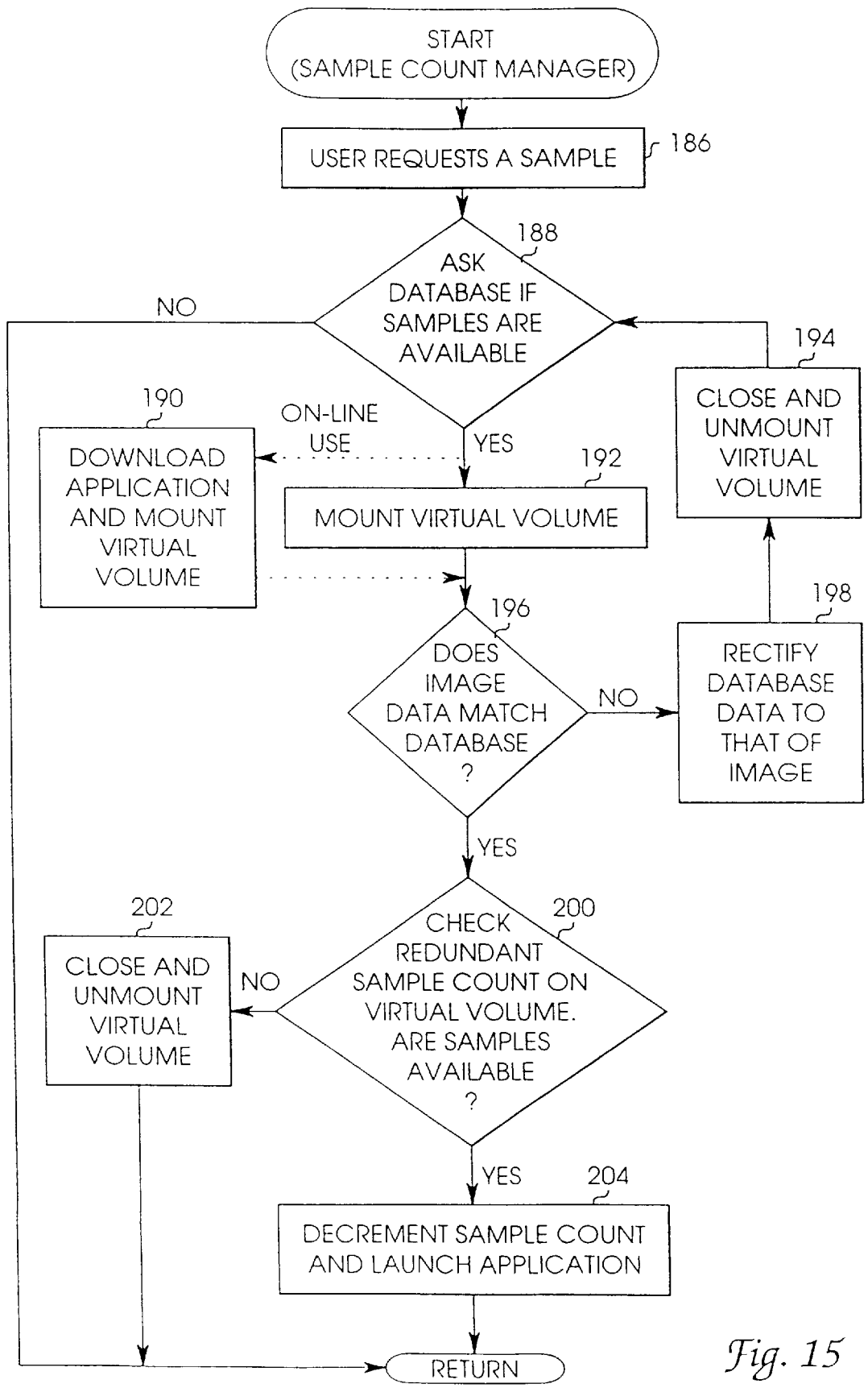
FIG. 15 is a flow chart of a preferred sample count manager routine.

FIG. 15 is a flow chart of a sample count manager routine. This routine is executed when the user requests a sample (186). The system checks to determine if samples are available (188) by checking the sample count files within the database. If samples are available, the system mounts the virtual volume (192). If the use is on-line, then the system downloads the software packages containing encrypted programs to be sampled and usage file and mounts the virtual volume (190). The packages are typically compressed for transmission using, for example, Apple Computer, Inc.'s Cinepak compression scheme at a lossless level, and are transmitted using TC/IP protocol.

The system then determines if the loaded image matches the database image (196) for security purposes. If the image does not match, the database data is rectified to that of the image (198) and the virtual volume is closed and unmounted (194) in order to maintain the application in a locked state. Otherwise, the system checks the redundant sample count on the virtual volume to determine if samples are available and in particular if a sample count files have been tampered with (200). If no samples are available, the virtual volume is closed and unmounted (220). Otherwise, the system decrements the sample count and launches the application (204) so that the user may operate the application to be sampled.

Figure 16A:
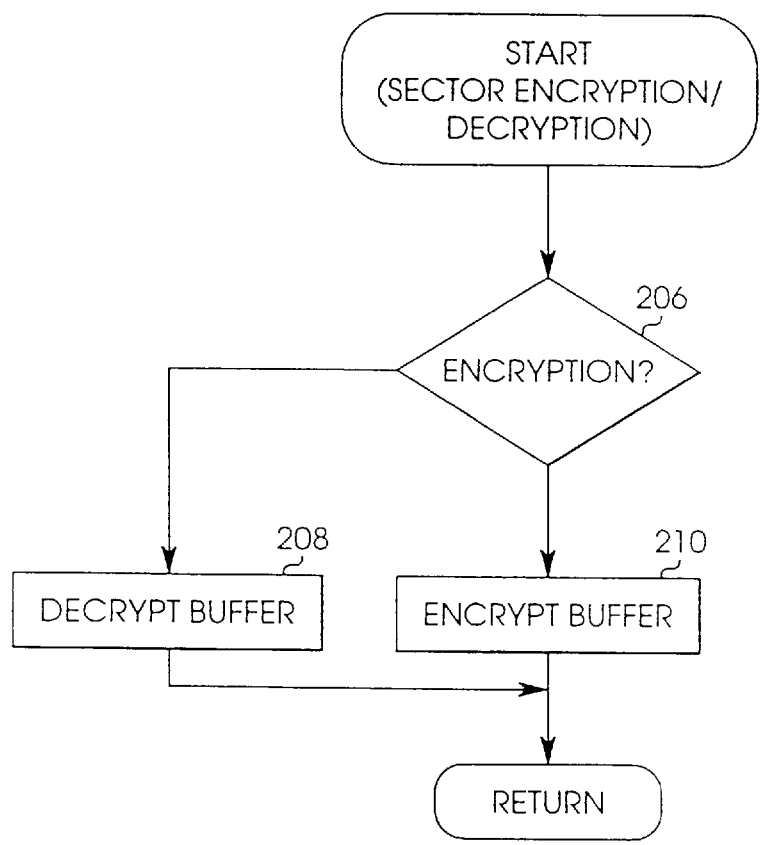
FIG. 16A is a flow chart of a preferred sector encryption/decryption routine.
Figure 16B:
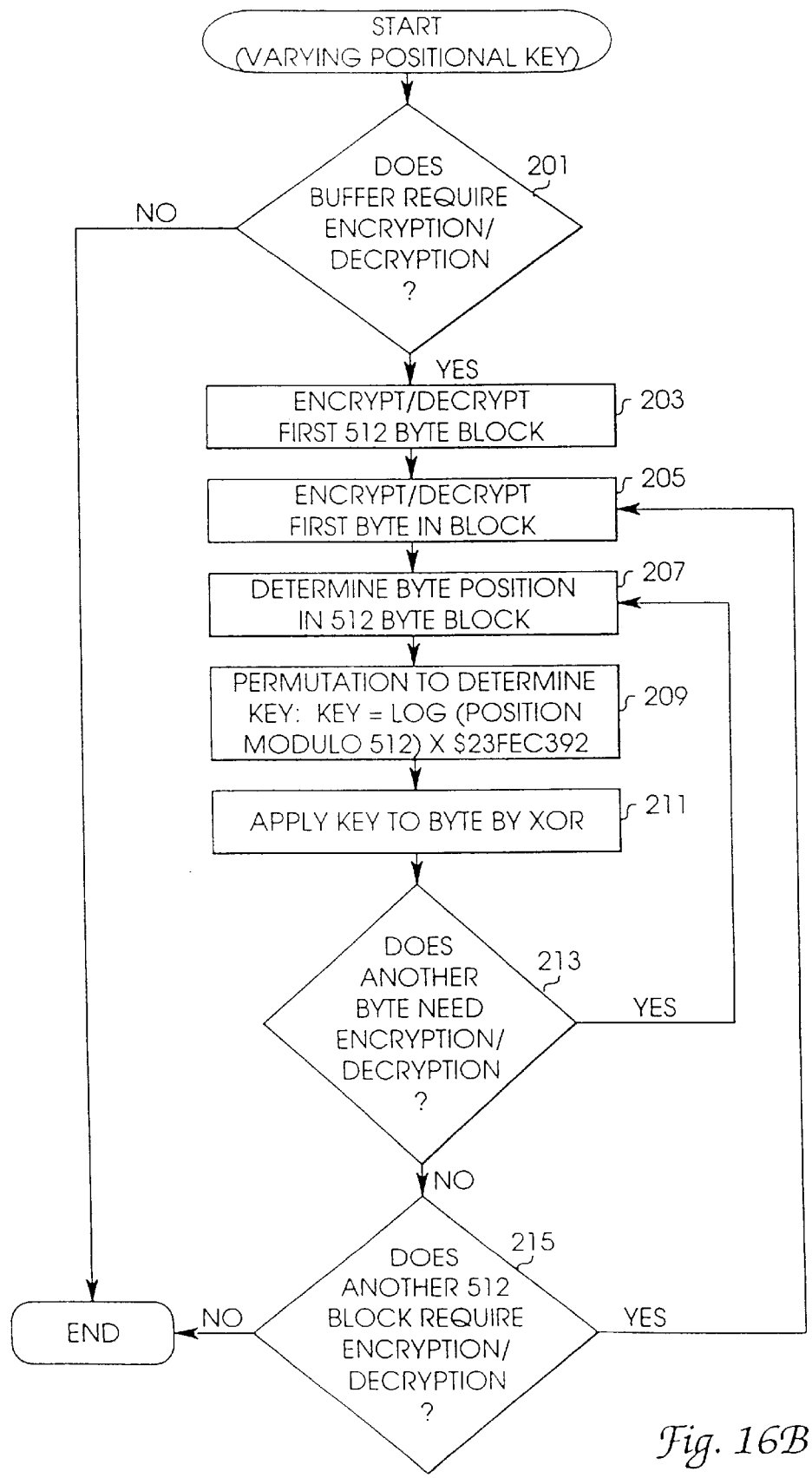
FIG. 16B is a flow chart of a preferred varying positional key encryption/decryption routine used with the routine of FIG. 16A.

FIG. 16A is a flow chart of a sector encryption/decryption routine. This routine performs encryption of the distributed digital information for security purposes in order to prevent unauthorized duplication of the information. In this routine, the system determines if encryption or decryption is required (206). The system then performs the appropriate decryption (208) or encryption (210) function. FIG. 16B is a flow chart of a preferred varying positional key encryption/decryption routine used with the routine of FIG. 16A. The routine in FIG. 16B performs the actual encryption/decryption of data and is an example of how to encrypt/decrypt the encrypted packages 62 and 68 (see FIG. 4A) which contain the distributed software programs or digital information and usage files. Other encryption schemes are possible. The significance of the encryption scheme is in providing protection of the distributed information so that one may not obtain an unauthorized copy of the information without considerable time, effort, and processing capability.

The encryption/decryption routine of FIG. 16B uses a varying key based on byte position, also referred to as a positional variant. The system determines if sector encryption/decryption is required (201). If it is, the system decrypts the first 512 byte block (203) and then executes loops, as determined by steps 205, 207, 213, and 215, in order to encrypt/decrypt each byte in a series a 512 byte blocks. The encryption/decryption of each byte involves first at step 209 a permutation to determine a key with the key=log(position MODULO 512)×$23FEC392, and then at step 211 applying the key to the byte with an XOR operation.

Figure 17:
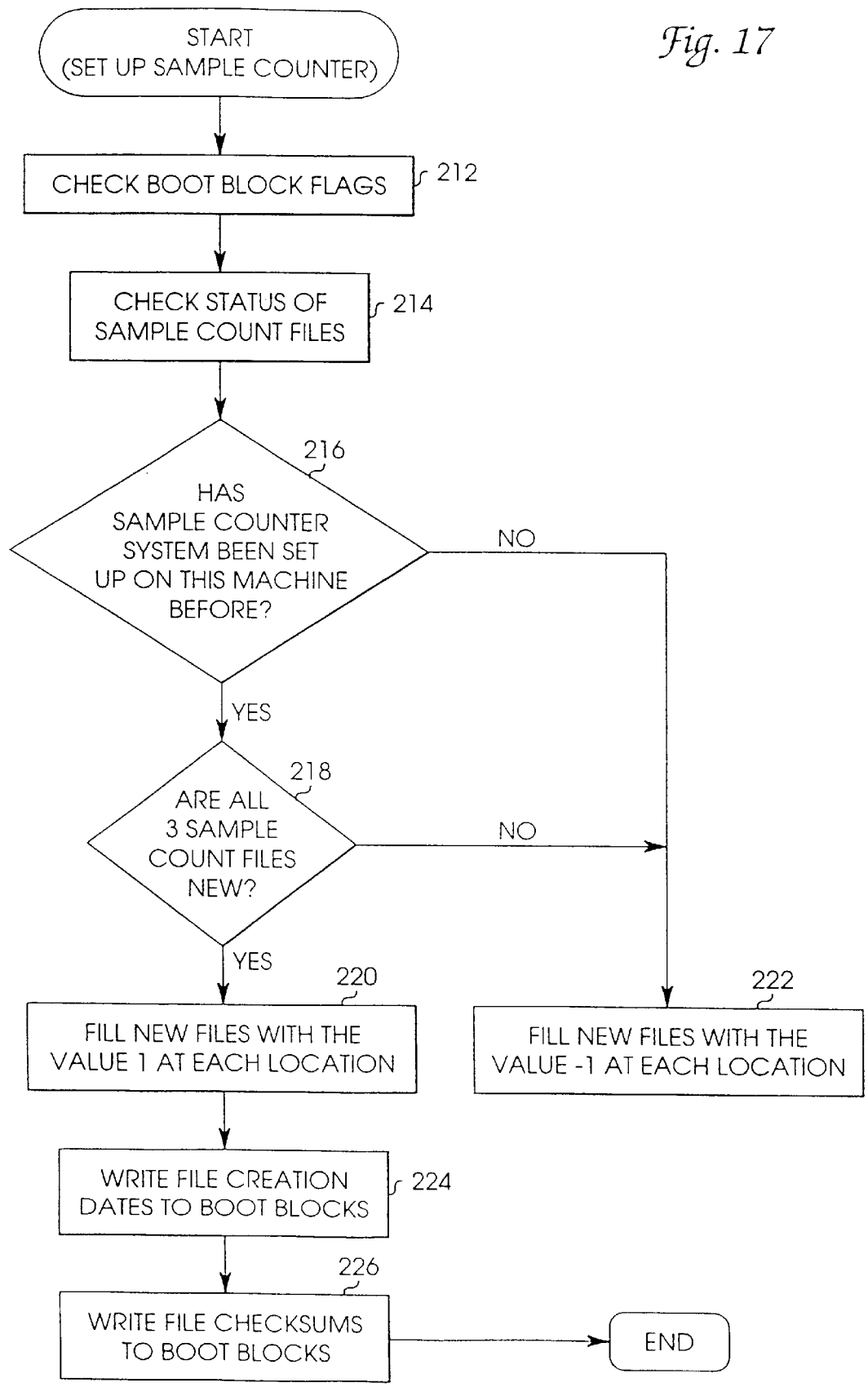
FIG. 17 is a flow chart of a preferred setup sample counter routine.

FIG. 17 is a flow chart of a setup sample counter routine. The system checks the boot block flags (212) and checks status of sample count files (214). This involves writing predetermined codes to spare boot blocks of the computer in order to mark the database to identify the execution of a software or digital information distribution system. Accordingly, these codes written to the boot blocks provide an indication that a distribution application has been run before on this particular computer.

This system for storing a code within an operating system of a computer in order to identify whether the computer has executed a particular software program typically includes the following features. It receives an indication that the computer has executed the software program, and searches a non-volatile memory in which the operating system for the computer is stored in order to locate spare memory locations within the non-volatile memory. A code is written to at least one of the spare memory locations, and the code provides an indication that the computer has executed the software program. The code is associates with the software program to provide the indication.

In the routine shown in FIG. 17, the system determines if the sample counter system has been set up before on this particular computer (216). If it has been set up before, the system determines if all three sample count files are new (218) and if they are, it executes the following steps: fill new files with the value "one" at each location (200); write file creation dates to boot blocks (224); and write file check sums to boot blocks (226). When the sample count files are initialized the first time the system is executed, the value "one" is written to the files in order to signal that the files are secure and the system can, therefore, write sample count values to the files. Otherwise, the system fills new files with the value "minus one" at each location within the boot blocks (222). The "minus one" value indicates to the system that the corresponding sample count file has been tampered with or is otherwise corrupted or not secure. Accordingly, the system checks the other sample count files in order to verify there security. If all sample count files have a value of "minus one," this condition indicates that all sample count files have been corrupted and the user is not allowed no more samples. If less than all sample count files have a value of "minus one," then the system can reconstruct the corrupted files using a value in the secure or non-corrupted sample count file. The system also preferably verifies the sample count information in the invisible files against the information in the usage file.

Figure 18:
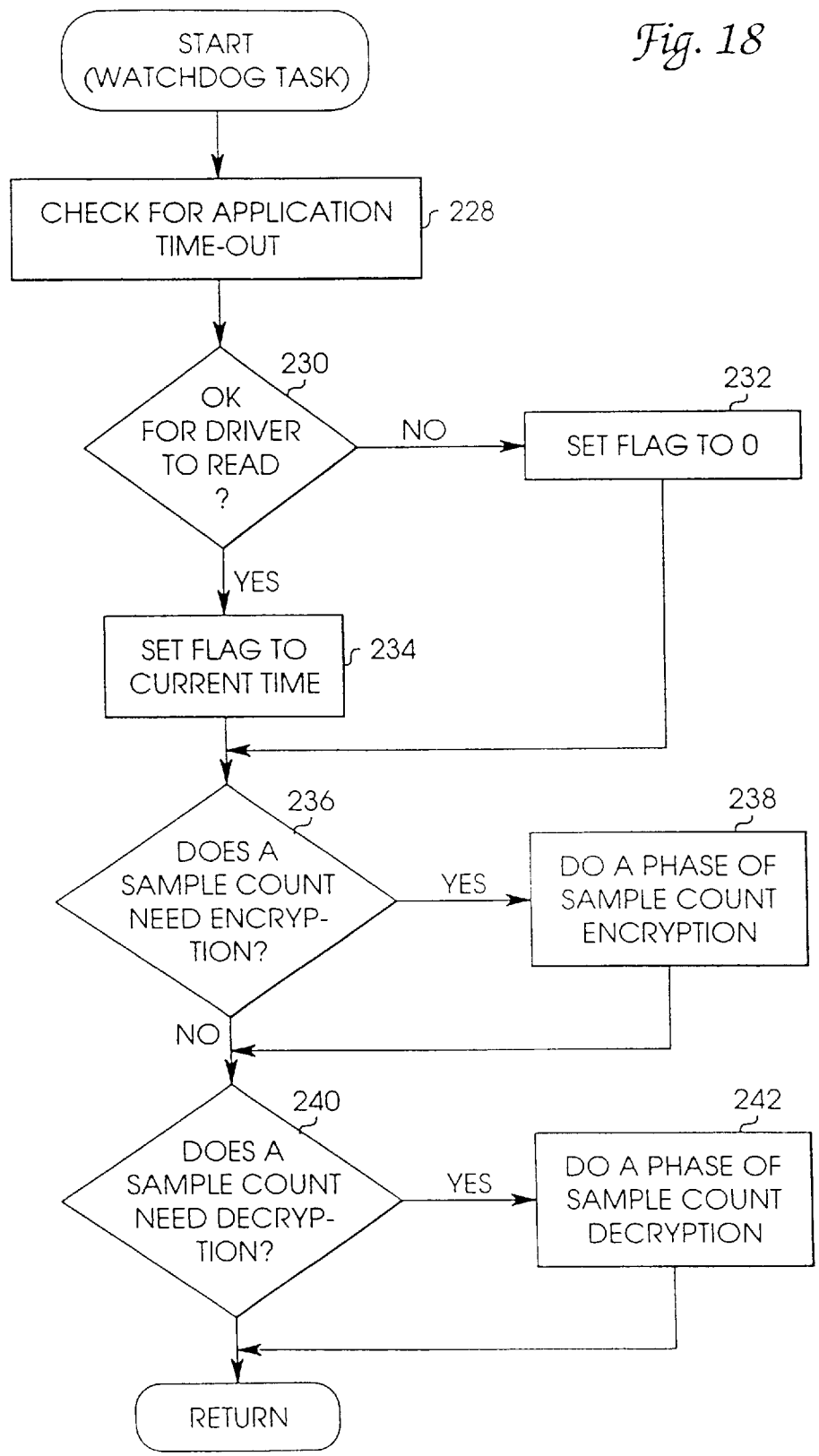
FIG. 18 is a flow chart of a preferred watchdog task routine.

FIG. 18 is a flow chart of a watchdog task routine. This is a VBL task, meaning it runs every time there is a vertical blanking interrupt. For most monitors, that is approximately 72 times per second. The routine has three functions. It performs a check to determine if the sample application has timed out, and sets a flag accordingly. It tests to determine if it may allow the driver read, and updates a flag with the current time to be checked by the driver. It also encrypts and decrypts sample counts that are being written/to and read/ from the sample count files. It performs this encryption in multiple phases, simulating an asynchronous process. What this does is make it very difficult for a user to determine where the encryption/decryption is being performed.

In the routine, the system checks for an application time out (228). It then determines if it is "OK" for the driver to read (230). If it is, it sets a flag to a current time (234). Otherwise, it sets a flag to zero (232). The system then determines if a sample count requires encryption (236). If it requires encryption, the system performs a phase of sample count encryption (238). Otherwise, the system determines if a sample count reads decryption (240), and if so, the system performs a phase of sample count decryption (242).

This phase encryption/decryption scheme is a subset of the sample count manage routine and works as follows. At various times, the distribution application needs to determine how many samples of a particular application remain. At these times, the distribution application reads an encrypted string from the invisible files. It then takes this information, transfers the information into global memory, signals to the watchdog task that a count needs decryption, and then places itself into a seemingly endless loop. The watchdog task, having been signalled to begin, decrypts the count in three phases to ensure that the full algorithm is never directly viewed by a user. On each pass, the watchdog task performs an XOR and bit rotation and then increments the phase count. The next time the watchdog task executes, if there is still more work to be done, it executes another encryption phase. If not, it signals the application that encryption is now finished. The distribution application then exits the infinite loop and memory contains the correct sample count.

Figure 19:
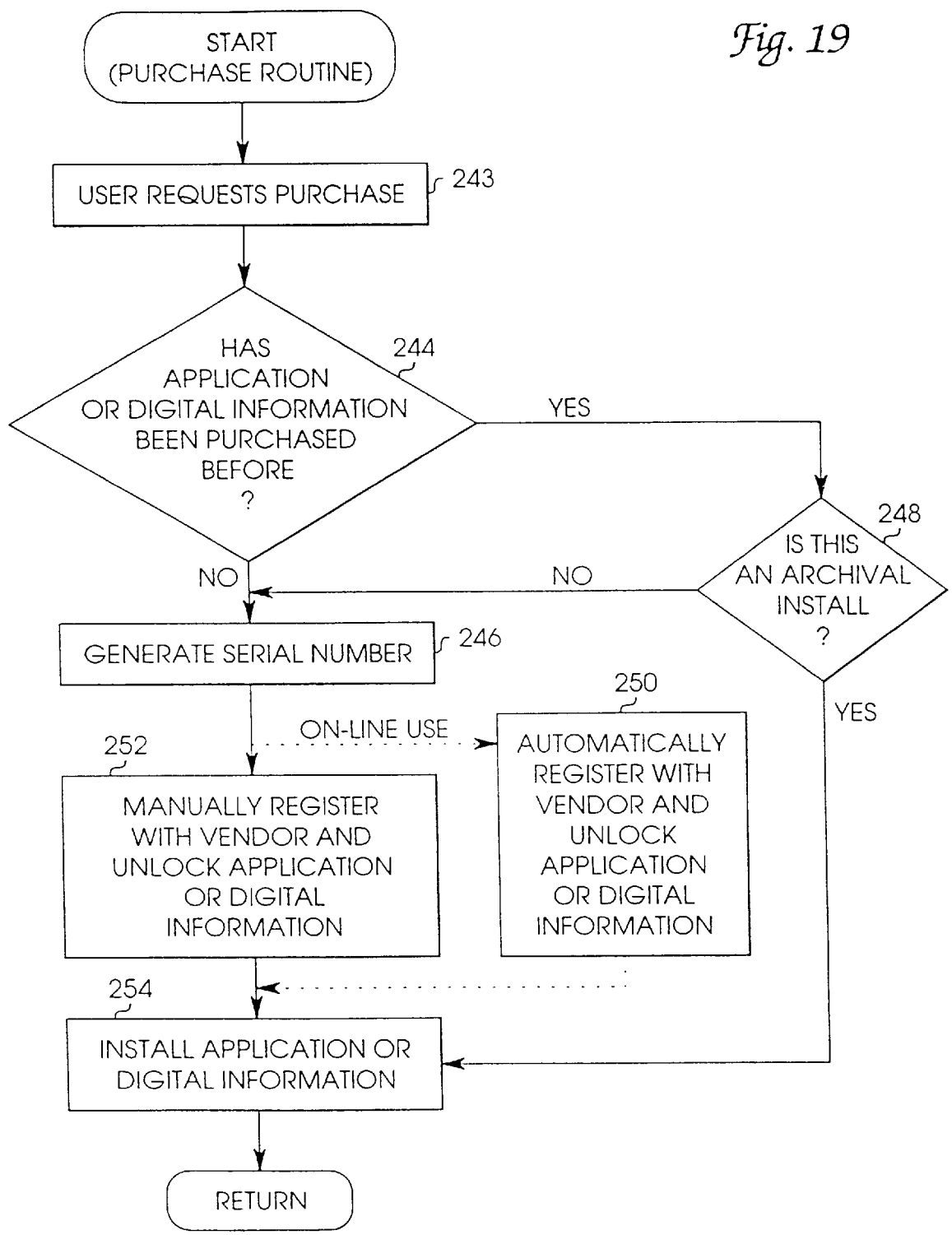
FIG. 19 is a flow chart of a preferred purchase routine for allowing users to purchase sampled software programs.

FIG. 19 is a flow chart of a purchase routine for allowing users to purchase sampled software programs. This routine is executed when a user requests to purchase a program or digital information (243). The system can unlock software programs or digital information in response to a request to purchase the software program or digital information. The system can optionally verify purchase information, such as a credit card number, before executing an unlocking process.

The system typically checks if the application has previously been purchased (244). If it has been purchased previously, the system checks to determine if this purchase request is an archive install (248). If it is an archive install, the system installs the application (254). For a regular purchase, the system generates or retrieves a serial number or key code (246) used for calculating a password to unlock the program. This serial number or key code is typically provided in a purchase dialog or window when the user selects the purchase key 48 (see FIG. 3). The purchase window also includes an area for a user to enter the password. The key code and corresponding password, as explained below, are preferably dynamically generated when the user opens the purchase window such that a new key code and password are generated each time the user opens the purchase window. In addition, the password preferably only exists in memory, and only as long as the user has a purchase dialog or window open. These features provide additional security by dynamically changing the key code and password.

If the use is on-line, the system preferably automatically registers the application with a vendor and then unlocks the application or digital information (250) through the on-line connection with the distribution center.

otherwise, the system can manually register the application with the vendor and provide a user with the password for unlocking the application or digital information (252). The manual registration typically occurs with the user calling up a distribution center and providing them with the serial number or key code as provided in a purchase dialog and possibly other information such as a credit card number. The distribution center in response provides the user with a password used for unlocking the application, and the user may then manually enter the password in the purchase window. Accordingly, steps 250 and 252 also involve generating the password from the serial number or key code. The serial number or key code provided by the user is processed using an identical decoding function, explained below, as on the user's machine, generating the same password that is stored in memory on the user's machine. The entered password is compared with the one stored in memory. If they match, the purchase is completed.

Accordingly, if the correct password is entered, either manually or automatically, the system proceeds to install the application or digital information (254). If the wrong password was entered, such as in the manual unlocking, then the system "returns" and does not unlock the application or digital information.

The installation typically occurs by decrypting a copy of the application or digital information and copying the unlocked application or digital information to a hard drive or other storage medium on the user's computer. The decryption is typically accomplished by copying the application or digital information via a pipeline from its current location in memory to a new (non-reserved) portion of the user's hard disk drive or other storage medium which is outside of the partition reserved by a software or digital information distribution system. While the application or digital information is copied to the non-reserved portion, it is typically decrypted by using the technique explained with reference to FIGS. 16A and 16B. Accordingly, after this unlocking routine is complete, a locked copy of the application or digital information remains within the reserved partition and an unlocked copy of the application or digital information resides on the user's hard disk drive or some other storage medium. The unlocking and installation may occur simultaneously. In addition, while software programs typically require installation to run, other types of digital information may require only unlocking.

After the application is purchased, a user preferably has full use of the program or digital information. A vendor or distribution center may mail manuals or any other documentation for the purchased program to the user who purchased the program. Alternatively, the manuals and documentation may be distributed with the program and maintained in a locked state with the program. When a user purchases the program, the manuals and documentation may then also be unlocked so that the user can view them electronically or produce a hard copy using a computer printer.

Figure 20:
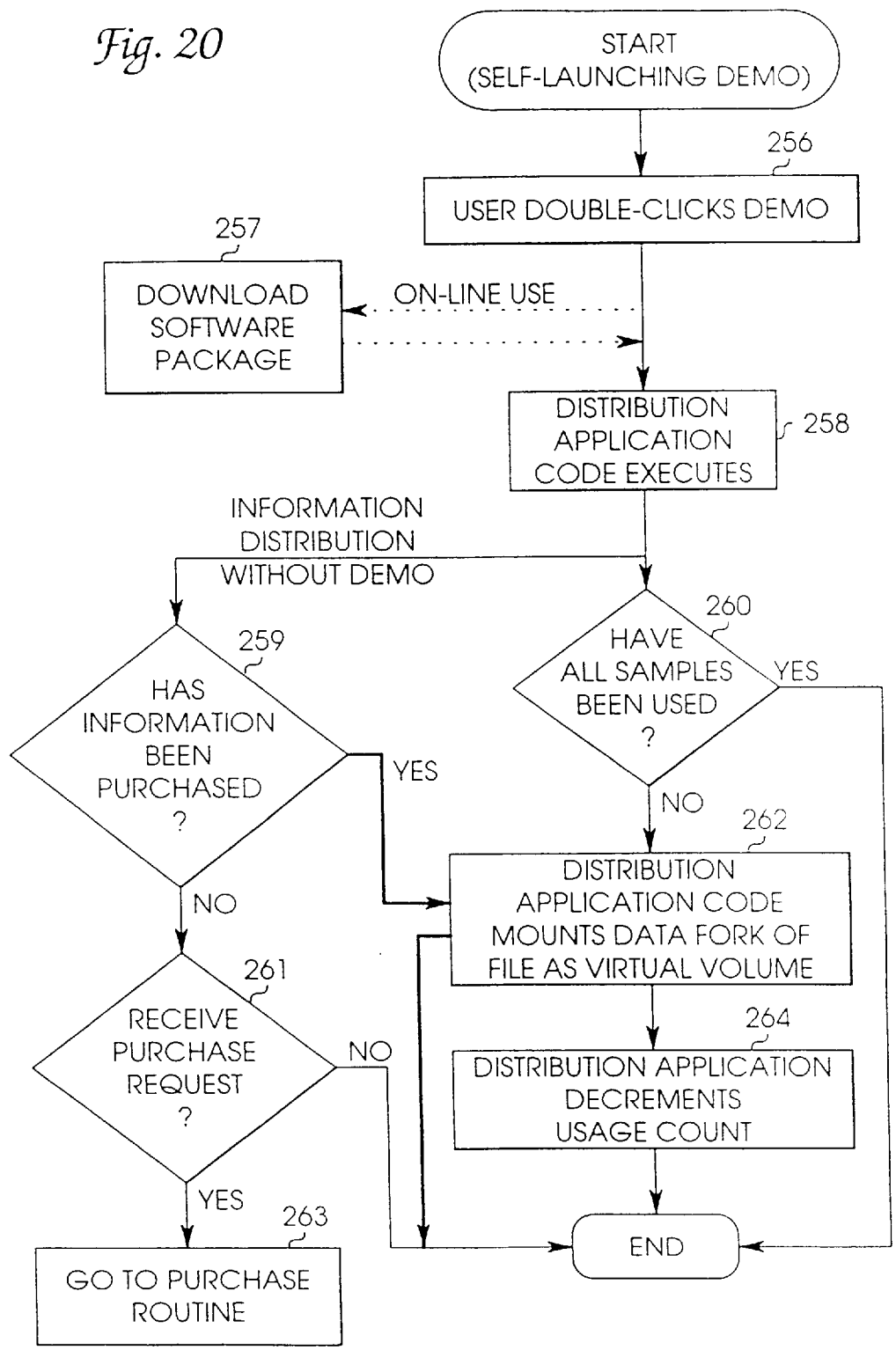
FIG. 20 is a flow chart of a preferred process for a self-launching and on-line self-launching software or digital information distribution system.

FIG. 20 is a flow chart of a process for a self-launching and on-line self-launching software or digital information distribution system. A self-launching system has the advantage of not requiring a separate browser for distribution and/or sampling of applications or digital information. The operation of the system is thus essentially invisible to the user, since the system preferably "appears" to the user as an application or digital information and launches itself when a user selects the application or digital information.

According, a self-launching system for demonstrating applications typically includes the following features. The system is attached to a software program such as in one file as described above. The system maintains the software program in a locked state in order to prevent unauthorized duplication of the software program, such as with encryption and a package file system described above. When a user selects the software program, the system launches itself and can enable the software program for execution by the user and allow the user to subsequently sample the software program. The system maintains the software program in the locked state during the sampling of the software program in order to prevent unauthorized duplication of the software program, and selectively disables the sampling of the software program.

A self-launching system for distributing applications or digital information typically includes the following features. The system is attached to an application or digital information such as in one file as described above. The system maintains the application or digital information in a locked state in order to prevent unauthorized duplication, such as with encryption and a package file system described above. When a user selects the application or digital information, the system launches itself and can unlock the application or digital information in response to a purchase request.

Self-launching and on-line self-launching software or digital information distribution systems preferably use the processing described above in addition to the steps shown in FIG. 20. In order to sample an application, a user in a self-launching system typically selects an application (256). This may occur by, for example, "double clicking" on an icon displayed on a display device and corresponding to the application. In the self-launching system, therefore, the applications typically appear to the user as executable programs even though they are locked and may only be sampled by the user or purchased upon providing the required information. After the user selects the application to sample, the code for the distribution application executes (258). If the use is on-line, the software package described above is first downloaded (257) before executing. The software package is typically one file (see FIG. 4A) which includes a distribution application and an encrypted package and is thus transmitted for on-line use as one file. The encryption is typically accomplished using the technique described with reference to FIGS. 16A and 16B. The encryption protects the software programs or digital information during transmission. This file is typically compression for transmission using, for example, Apple Computer, Inc.'s Cinepak compression scheme at a lossless level, and is transmitted using TC/IP protocol.

The system then, as described above, checks to determine if all samples have been used (260). If samples are remaining, the system code mounts a data fork of file as the virtual volume (262) and decrements the usage count and the files in the virtual volume (264). The system then proceeds with the processing described in the other flow charts provided in the present specification.

If the self-launching system involves distribution of digital information without allowing sampling, then the system typically checks to determine if the information has been purchased (259). If is has been purchased, then the system executes step 262 and bypasses step 264, since samples are not available. If the information has not been purchased, then the system typically checks to determine if the user wants to purchase the information (261). If the system receives a purchase request, then it executes a purchase routine 263 (see FIG. 19).

Figure 21:
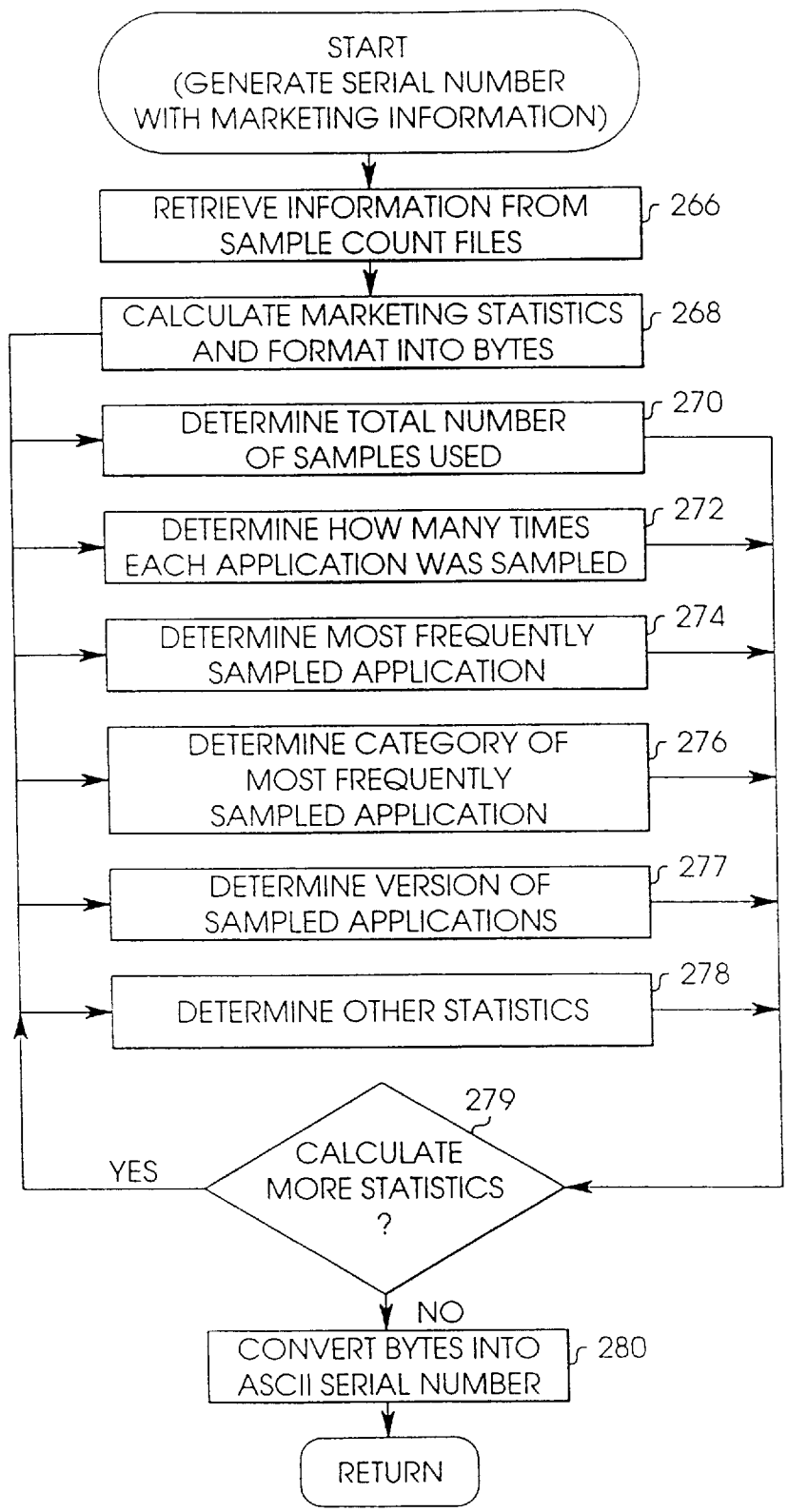
FIG. 21 is a flow chart of a preferred process for generating a serial number which contains identification of marketing information for sampled software programs.

FIG. 21 is a flow chart of a process for generating a serial number which contains identification of marketing information for software programs. The system retrieves the raw data from a sample count files (266), which includes an identification of how many times a user sampled each application. The system then calculates marketing statistics and formats such information into a series of bytes (268). This step may involve, for example, the following: determining the total number of samples used (270); determining how many times each application was sampled (272); determining a most frequently sampled application (274); determining a category of a most frequently sampled program (276); determining which version of particular applications a user has sampled (277); or other statistics to be determined, for example, by a distributor (278). Other statistics may include, for example, statistics related to time duration of the samples, such as an average time duration of sampling, which may be obtained using a computer's internal clock and timing each sample. Examples of categories of software programs include, but are not limited to: business software, games, financial management programs, and educational programs. A vendor or distributor may also create their own categories and electronically associate programs with those categories.

Gathering these statistics provides for many advantages and value in distributing programs to be sampled. For example, it allows vendors to identify programs which are not popular and replace them with programs which have a higher sales rate. It also allows vendors to identify the most popular programs and include more programs for sale in the same categories. Identifying a category of a user's most frequently sampled program also allows vendors to market additional similar products to that particular user and thus increase the likelihood that the user will purchase more software from the vendor. For example, when the user calls the vendor to purchase a program, the vendor can quickly identify the most frequently sampled program category by decoding the code (serial number) of the purchased program. The vendor could then immediately offer any additional programs for sale which are in the same category and perhaps "on sale" or subject to a discount.

Given the information provided by the sample count files, the information for the marketing statistics can be determined with simple calculations. The sample count files contain an identification of each application and the number of samples remaining for the corresponding application. Therefore, by knowing how many samples were originally available, the system can determine the number of samples used for each application by samples remaining from the original number of allowed samples. The system can add up the number of samples used to determine a total number of samples used. Other statistics can be calculated in a similar manner using the information in the sample count files and possibly other information such as categories of sampled applications.

A distributor may determine that other statistics are desired and the system would then execute additional steps as part of step 268, as mentioned above. The system determines if more statistics are required (279). The system continues to execute steps for determining statistics until such processing is complete. As the system gathers and calculates the marketing statistics, it typically concatenates the resulting bytes, resulting in a series of bytes with byte representing a statistic. The system electronically associates each byte position with a statistic so that, by knowing a particular byte position, the system can decode the byte and produce the resulting statistic. The system then converts the series of bytes determine that step 268 into an ASCII serial number (280). Table 1 provides an example of a file for associating byte positions with statistics.

TABLE 1

| byte position | statistic |
|---|---|
| 1 | total number of samples |
| 2 | number of application #1 samples |
| 3 | number of application #2 samples |
| 4 | most frequently sampled category |
| ... | ... |
| N | other statistic |

Appendix A provides an example of a source code listing in C programming language for converting the series of bytes determined in the processing shown in FIG. 21, and optionally other information, into a key code and password for use in unlocking the application or digital information. The code shown in Appendix A generates both a key code and password using the marketing information (series of bytes described above) and the current date and time. The code shown in Appendix A can thus also be used to decode the key code and extract the series of bytes containing the marketing information. The key code is displayed to the user and in the purchase window and is what the user provides to a distribution center to obtain the password. This password is then used to unlock the application or digital information, as described above.

Figure 22:
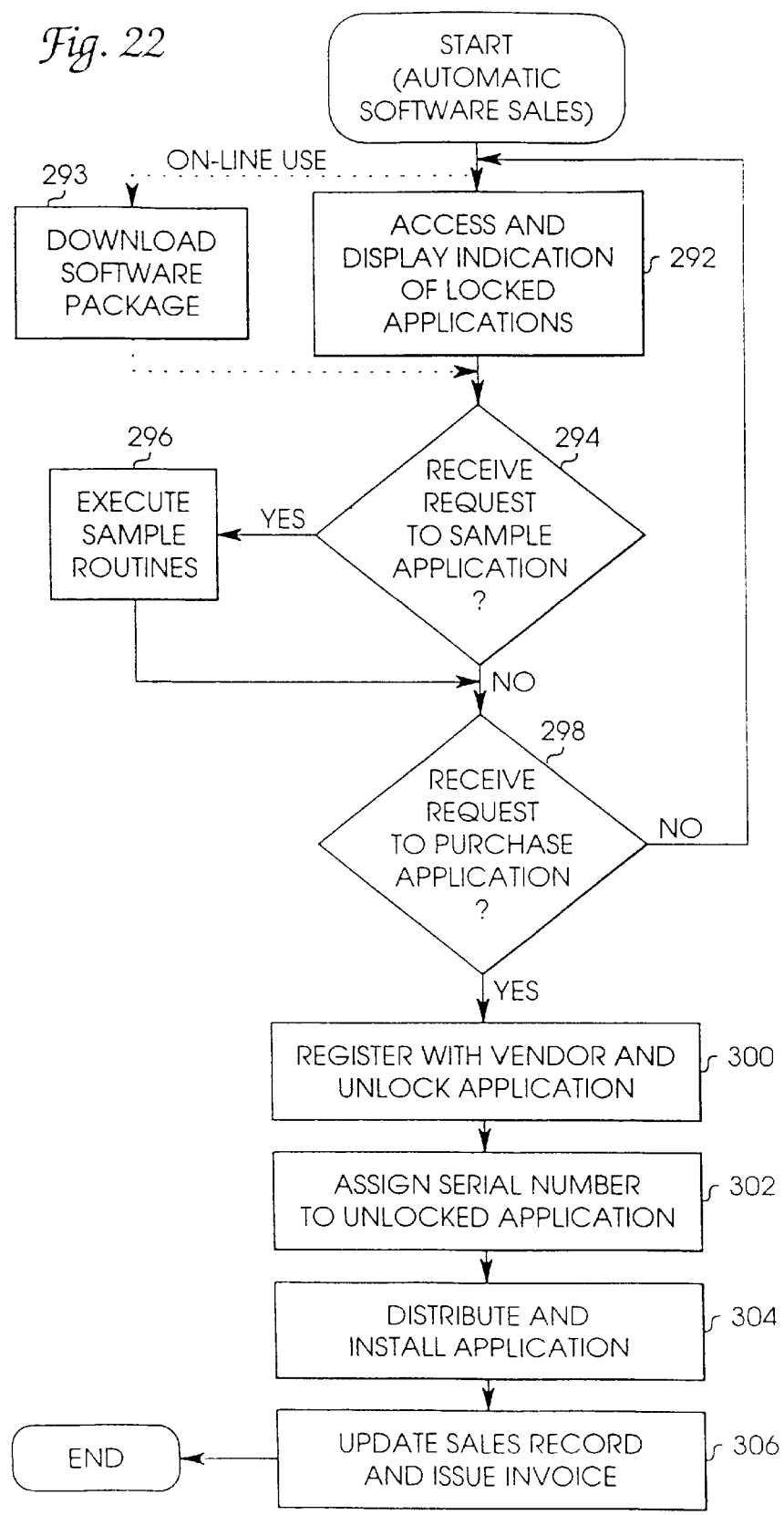
FIG. 22 is a flow chart of a preferred process for automatic sale of software programs.

FIG. 22 is a flow chart of a process for automatic sale of software programs. One or more software programs, each in a locked state such as with the techniques described above, are stored in a computer database or available on-line. When one wants to purchase one or more of the programs, the system in response to the purchase request unlocks a copy of the program and maintains a record of how many copies were sold. An example of a use for this system is where a company routinely purchases additional copies of software programs such as when new employees are hired.

Accordingly, this system for automatic sales of software programs typically includes the following features. It accesses a software program within a computer database and maintains the software program in a locked state in order to prevent unauthorized duplication of the software program. In response to a request to purchase the software program, the system unlocks a copy of the software program and distributes the unlocked copy. The system also records how many copies of the software program have been distributed in response to the requests to purchase the software program.

As shown in FIG. 22, the system typically displays an indication of locked applications available for purchase by a user (292). If the use is on-line, the system downloads encrypted software packages containing programs and usage file (293). The encryption is typically accomplished using the technique described with reference to FIGS. 16A and 16B. The packages are typically compressed for transmission using, for example, Apple Computer, Inc.'s Cinepak compression scheme at a lossless level, and are transmitted using TC/IP protocol. If a user requests to sample a particular application (294), the system executes sample routines (296). The sample routines may be, for example, the routines described in the present specification. If the system receives a request to purchase an application (298), it preferably performs the following steps. The application is registered with a vendor and unlocked (300). A serial number is then optionally assigned to the purchased application (302). The application is distributed and installed (304). Then the system updates a sales record and issues an invoice (306) in order to record the application purchased and how many copies have been purchased. The step 300 may be implemented as described in the other routines in the present specification.

While the present invention has been described in connection with a preferred embodiment thereof, it will be understood that many modifications will be readily apparent to those skilled in the art, and this application is intended to cover any adaptations or variations thereof. It is manifestly intended that this invention be limited only by the claims and equivalents thereof.

APPENDIX A

```
void CDolphinApp::doPurchase( )
{
    CSampleApp *theApp;
    const short okItem = 1;
    const short cancelItem = 2;

unsigned long temp1 = qd.randSeed;
    unsigned long temp3;

GetDateTime(&temp3);
    temp3 = temp3 & 0x00000065;
    temp3 = temp3 >> 2;

unsigned long temp0 = *((long*)0x0146);
    temp3 = temp3 & 0x2F;

// ROL.L temp3,temp0
    long a = temp0 << temp3;
    long b = temp0 >> (32 - temp3);
    temp0 = a | b;

GetDateTime(&temp3);
```

APPENDIX A-continued

```
    temp1 = temp3 ^ temp1;

a = temp3 << 7;
    b = temp3 >> (32 - 7);
    temp0 = a | b;
    temp3 = temp0 ^ temp3;

gd.randSeed = temp0;
    temp3 = temp3 & 0x0000000E;

long keyCode = 0;
    for (short r = 0; r < temp3; r++)
        keyCode = Random( );

CStr255 usageCode;

{
        unsigned long installedDate = gUsageInfo.GetInstalledDate
            ("Dolphin Prefere
        installedDate -= 0xA81B3480;
        installedDate = installedDate / 0x00093A80;

CStr255 instWkStr;
        CodeNumber(installedDate,2,instWkStr);

long numOfProgsSampled =
        gUsageInfo.GetTotalAppsSampled ( );
        CStr255 numProgsSampleStr;
        CodeNumber(numOfProgsSampled,2,numProgsSampledStr);

TopSampleA top5;
        gUsageInfo.GetTop5SampledApps (top5);

CStr255 num1AppStr;
        CStr255 num2AppStr;
        CodeNumber(top5[0],2,num1AppStr);
        CodeNumber(top5[1],2,num2AppStr);

long totalSamples = gUsageInfo.GetTotalNumOfSamples( );
        CStr255 totalSamplesStr;
        CodeNumber(totalSamples,2,totalSamplesStr);

usageCode = instWkStr +
                numProgsSampledStr +
                num1AppStr +
                num2AppStr +
                totalSamplesStr;
    }

CStr255 programNumStr;
    CodeNumber (fSelectedAppID, 3, programNumStr);
    CStr255 keyCodeStr;
    CodeNumber (keyCode, 4, keyCodeStr);

CStr255 targetPassword = deecode (keyCodeStr);

keyCodeStr = programNumStr + CStr255("-") + keyCodeStr;

if ((itemHit == okItem) &&
    (IUEqualString(password,purchaseBackDoor) == 0))
            theApp->SetToPurchased( );
            CRect upperLeftRect(0,0,150,60);
            InvalRect(upperLeftRect);
            InstallApp ( );
    }
    if ((itemHit ==okItem) &&
    (IUEqualString(password,unPurchaseBackDoor) == 0
            theApp->SetToUnPurchased( );
            CRect upperLeftRect(0,0,150,60);
            InvalRect(upperLeftRect);
    }
    } else {
        SysBeep(1);
        SysBeep(1);
    }
} void CodeNumber(long number, short digits, CStr255& the String)
{
```

APPENDIX A-continued

```
        long temp2;

theString[0] = digits;

for (short index = digits, index > 0; index--) {
                temp2 = number;
                temp2 = temp2 & 0x0000001F;
                temp2 += 65;
                if (temp2 >= '2')
                        temp2 -= 41;
                theString[index] = temp2;
                number = number >> 5;
        }
        if (number > 0)
                the String[1] = 42;
}

CStr255 deecode(const CStr255& input)
{
        char output[7];
        char stg[2];
        int msg_number;
        int b1, B1, xx, len, retcode;
        long  code, bin;

len = input.Length ( );

code = 0;

for (xx = 1; xx < 5; xx++)
                {
                B1 = 0;
                sprintf(stg, "%d", input[xx] );
                b1=atoi( stg );
                if (b1 > 64 && b1 < 91)
                        B1 = b1 - 65;
                if (b1 > 49 && b1 < 56)
                        B1 = b1 - 24;

switch (xx)
                {
                        case 1:
                                code+= B1 * 32768;
                                break;
                        case 2:
                                code+= B1 * 1024;
                                break;
                        case 3:
                                code+= B1 * 32;
                                break;
                        case 4:
                                code+= B1;
                                break;
                        default:
                                break;
                        }
                }
code = (code ^ 43605) * 1523;

for (xx = 0; xx < 6; xx++)
        {
        switch (xx)
        {
                case 0:
                        bin = 33554432;
                        break;
                case 1:
                        bin = 1048576;
                        break;
                case 2:
                        bin = 32768;
                        break;
                case 3:
                        bin - 1024;
                        break;
                case 4:
                        bin = 32;
                        break;
```

APPENDIX A-continued

```
                case 5:
                        bin = 1;
                        break;
                default:
                        break;
        {
        if (code >= bin)
                {
                B1 = code / bin;
                code-=B1 * bin;
                if (B1 + 65 <= 90)
                        {
                        b1 = B1 + 65;
                        }
                else
                        {
                        b1 = B1 + 24;
                        }
                }
        else
                {
                b1 = 65;
                } sprintf(&output[xx], "%c", b1);
        output[6] = '\0';
        }
        return(CStr255(output));

} pragma segment Main
long intcode(const CStr255& input)
{
        char   stg[2];
        int msg_number;
        long b1, B1, xx, len, retcode, code;

len = input.Length( );

code = 0;

for (xx = 0; xx < 4; xx++) {
                B1 = 0;
                sprintf(stg, "%d", input[xx] );
                b1=atoi( stg );
                if(b1 > 64 && b1 < 91)
                        B1 = b1 - 65;
                if (b1 > 49 && b1 < 56)
                        B1 = b1 - 24;

switch (xx)
                {
                        case 0:
                                code+= B1 * 32768;
                                break;
                        case 1:
                                code+= B1 * 1024;
                                break;
                        case 2:
                                code+= B1 * 32;
                                break;
                        case 3:
                                code += B1;
                                break;
                        default:
                                break;
                }
        }
        return(code)) ;
}
```

What is claimed is:

1. An on-line system for demonstrating software programs to a potential purchaser of the programs, comprising:

receive means for receiving from an electronically accessible system a software program to be demonstrated;

protection means for maintaining the software program in a locked state in order to prevent unauthorized duplication of the software program, the protection means comprising:

an image file loaded in a computer-readable medium and having an internal configuration of a specially formatted disk with the software program being stored therein; and an image driver configured to prevent unauthorized access to the software program in the image file; and sample means for enabling the software program for execution upon selection by a user, for allowing the user to subsequently sample the software program, for maintaining the software program in the locked state during the sampling of the software program in order to prevent unauthorized duplication of the software program, and for selectively disabling the sampling of the software program.

2. The system of claim 1 wherein the sample means further comprises means for preventing the enabling of the software program when the user has already sampled the software program a predetermined number of times.

3. The system of claim 1 wherein the sample means further comprises means for detecting if the software program is being copied during the sampling of the software program and for disabling the software program in response to the detecting.

4. The system of claim 1 wherein the sample means comprises means for limiting how many times the software program can be sampled and for displaying an indication of a number of samples remaining.

5. The system of claim 1 wherein the disable means comprises means for disabling the software program if the user has sampled the software program for a predetermined amount of time.

6. The system of claim 1 wherein:

the receive means comprises means for receiving the software program in an encrypted state; and the sample means comprises means for decrypting the encrypted software program.

7. The system of claim 1, further comprising means for generating a code identifying the software program.

8. The system of claim 1 wherein the sample means comprises means for displaying an icon which identifies the software program.

9. A computerized on-line method for demonstrating software programs to a potential purchaser of the programs, comprising the steps executed by a computer of:

receiving from an electronically accessible system a software program to be demonstrated;

maintaining the software program in a locked state in order to prevent unauthorized duplication of the software program, the maintaining step using an image file having an internal configuration of a specially formatted disk with the software program stored therein, the maintaining step using an image driver configured to prevent unauthorized access to the software program in the image file; and enabling the software program for execution upon selection by a user, allowing the user to subsequently sample the software program, maintaining the software program in the locked state during the sampling of the software program in order to prevent unauthorized duplication of the software program, and selectively disabling the sampling of the software program.

10. The method of claim 9 wherein the enabling step further comprises the step executed by the computer of preventing the enabling of the software program when the user has already sampled the software program a predetermined number of times.

11. The method of claim 9 wherein the disabling step further comprises the steps executed by the computer of detecting if the software program is being copied during the sampling of the software program and disabling the software program in response to the detecting.

12. The method of claim 9 wherein the enabling step comprises the steps of limiting how many times the software program can be sampled and displaying an indication of a number of samples remaining.

13. The method of claim 9 wherein the disabling step comprises the step of disabling the software program if the user has sampled the software program for a predetermined amount of time.

14. The method of claim 9 wherein:

the receiving step comprises means the step of receiving the software program in an encrypted state; and the enabling step comprises the step of decrypting the encrypted software program.

15. The method of claim 9, further comprising the step executed by the computer of generating a code identifying software program.

16. The method of claim 9 wherein the enabling step comprises the step of displaying an icon which identifies the software program.

17. A computer program product, comprising:

a computer usable medium having computer readable program code means embodied therein for causing a computer to demonstrate on-line software programs to a potential purchaser of the programs, the computer readable program code means in the computer program product comprising:

receive means for causing the computer to receive from an electronically accessible system a software program to be demonstrated;

protection means for causing the computer to maintain the software program in a locked state in order to prevent unauthorized duplication of the software program, the protection means comprising:

an image file having an internal configuration of a specially formatted disk with the software program stored therein; and an image driver configured to prevent unauthorized access to the software program in the image file; and sample means for causing the computer to enable the software program for execution upon selection by a user, allow the user to subsequently sample the software program, maintain the software program in the locked state during the sampling of the software program in order to prevent unauthorized duplication of the software program, and selectively disable the sampling of the software program.

* * * * *